US011951749B2

(12) United States Patent
Nakayama

(10) Patent No.: US 11,951,749 B2
(45) Date of Patent: Apr. 9, 2024

(54) HEAD CHIP, LIQUID JET HEAD, AND LIQUID JET RECORDING DEVICE

(71) Applicant: SII Printek Inc., Chiba (JP)

(72) Inventor: Hitoshi Nakayama, Chiba (JP)

(73) Assignee: SII PRINTEK INC., Chiba (JP)

( * ) Notice: Subject to any disclaimer, the term of this patent is extended or adjusted under 35 U.S.C. 154(b) by 0 days.

(21) Appl. No.: 17/553,356

(22) Filed: Dec. 16, 2021

(65) Prior Publication Data

US 2022/0194092 A1 Jun. 23, 2022

(30) Foreign Application Priority Data

Dec. 21, 2020 (JP) ................................ 2020-210928

(51) Int. Cl.
*B41J 2/18* (2006.01)
*B41J 2/14* (2006.01)

(52) U.S. Cl.
CPC ............ *B41J 2/18* (2013.01); *B41J 2/14201* (2013.01)

(58) Field of Classification Search
CPC ........ B41J 2/18; B41J 2/14201; B41J 2/1609; B41J 2/1623; B41J 2/1632; B41J 2/14209; B41J 2/135; B41J 2/01; B41J 2/16
See application file for complete search history.

(56) References Cited

U.S. PATENT DOCUMENTS

| | | | |
|---|---|---|---|
| 6,070,310 A | 6/2000 | Ito et al. |
| 2018/0222196 A1 | 8/2018 | Kubota et al. |

FOREIGN PATENT DOCUMENTS

| | | | |
|---|---|---|---|
| EP | 2540504 A2 | 1/2013 |
| JP | H11-348278 A | 12/1999 |
| JP | 2018-122553 A | 8/2018 |
| JP | 2018-202817 A | 12/2018 |

OTHER PUBLICATIONS

IP.com search (Year: 2023).*
Global Dossier (Year: 2023).*
Takahashi, Yoshikazu, "Ink Jet Apparatus", Jan. 16, 2001, [Paragraphs 0032-0035, 0048] (Year: 2001).*
Extended European Search Report for Europe Application No. 21216168.1, dated Jun. 8, 2022, 8 pages.

* cited by examiner

*Primary Examiner* — Lisa Solomon
(74) *Attorney, Agent, or Firm* — Crowell & Moring LLP

(57) ABSTRACT

There are provided a head chip, a liquid jet head, and a liquid jet recording device each capable of ensuring an electrical reliability, and enhancing the durability. The head chip according to an aspect of the present disclosure includes an actuator plate having ejection channels and non-ejection channels extending in a Z direction and arranged alternately in an X direction, and a nozzle plate which has nozzle holes respectively communicated with the ejection channels, and faces the actuator plate. The non-ejection channels are terminated at positions separated from a lower end surface of the actuator plate. The ejection channels open on a lower end surface of the actuator plate.

8 Claims, 21 Drawing Sheets

HEAD CHIP, LIQUID JET HEAD, AND LIQUID JET RECORDING DEVICE

RELATED APPLICATIONS

This application claims priority to Japanese Patent Application No. 2020-210928, filed on Dec. 21, 2020, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

An inkjet head to be installed in an inkjet printer ejects ink to a recording target medium through a head chip installed in the inkjet head. The head chip is provided with an actuator plate provided with ejection channels and non-ejection channels, and a nozzle plate provided with nozzle holes communicated with the ejection channels. The ejection channels and the non-ejection channels are alternately arranged across respective drive walls (see e.g., JP-A-2018-122553).

In the head chip, in order to eject the ink, a voltage is applied between electrodes provided to the drive wall to cause the drive wall to make a thickness-shear deformation. Thus, due to a change in volume of the ejection channel, the ink in the ejection channel is ejected through the nozzle hole.

However, in the head chip, due to a variation in surface texture and a bonding defect and so on of the actuator plate and the nozzle plate, there is a possibility that unintended formation of a microscopic gap occurs between the actuator plate and the nozzle plate. When the ink in the ejection channel supposedly inflows into the non-ejection channel through the microscopic gap, there is a possibility that the electrode formed on an inner surface of the non-ejection channel is eroded or shorted by the ink.

SUMMARY OF THE INVENTION

The present disclosure provides a head chip, a liquid jet head, and a liquid jet recording device each capable of ensuring an electrical reliability, and enhancing the durability.

In view of the problems described above, the present disclosure adopts the following aspects.

(1) A head chip according to an aspect of the present disclosure includes an actuator plate in which a jet channel extending in a first direction and a non-jet channel extending in the first direction are arranged alternately in a second direction crossing the first direction, and a jet orifice plate which has a jet orifice communicated with the jet channel, and faces the actuator plate, wherein the non-jet channel is terminated at a position separated from an opposed surface to the jet orifice plate in the actuator plate, and the jet channel opens on the opposed surface.

According to the present aspect, since the non jet channel is not opened on the opposed surface, it is possible to prevent a liquid in the jet channel from entering the non jet channel through a microscopic gap unintentionally formed between the opposed surface of the actuator plate and the jet orifice plate.

Therefore, it is possible to prevent the electrodes formed on the inner surfaces of the non-jet channel from eroding or shorting, and thus, it is possible to provide the head chip which is excellent in electrical reliability, and in which an improvement in durability is achieved. Further, it is possible to relax the surface texture required for the opposed surface of the actuator plate, and therefore, it is possible to achieve an increase in fabrication efficiency and an increase in fabrication yield.

(2) In the head chip according to the aspect (1) described above, it is preferable to further include an intermediate plate which is disposed between the actuator plate and the jet orifice plate, and is provided with a communication channel configured to individually communicate the jet channel and the jet orifice with each other.

According to the present aspect, since the non jet channel is not opened on the opposed surface, it is possible to ensure the communication channel large in dimension in the second direction. Therefore, it is easy to allow the misalignment in the second direction between, for example, the jet orifice and the communication channel, or the jet channel and the communication channel. Therefore, it is possible to ensure the flow channel cross-sectional area of a communication portion between the jet orifice and the communication channel, and between the jet channel and the communication channel.

(3) In the head chip according to the aspect (2) described above, it is preferable to further include a flow channel member facing a surface other than the opposed surface of the actuator plate, wherein the flow channel member includes an entrance flow channel communicated with a plurality of the jet channels, and an exit flow channel communicated with a plurality of the communication channels in a lump.

According to the present aspect, since it is possible to ensure the communication channel large in dimension in the second direction, it is easy to ensure the flow channel cross-sectional area of the communication channel. In this case, since it is possible to increase the flow rate of the liquid flowing through the communication channel, it is possible to achieve suppression of clogging with a bubble in the jet orifice, and an increase in jet amount of the liquid through the jet orifice. Further, the pressure fluctuation generated in one of the jet channels when, for example, jetting the liquid is easily dissipated in the communication channel. Therefore, even when the plurality of jet channels are communicated with each other through the exit flow channel, it is possible to suppress a so-called cross talk in which the pressure fluctuation generated in one of the jet channels propagates to other jet channels through the communication channels and the exit flow channel.

On the other hand, since it is possible to ensure the communication channel large in dimension in the second direction, it is possible to suppress the thickness (the dimension in the first direction) of the intermediate plate while ensuring the flow channel cross-sectional area of the communication channel. Therefore, it is possible to effectively propagate the pressure fluctuation generated in the jet channel when jetting the liquid to the jet orifice.

As a result, the jet performance can be improved.

(4) In the head chip according to the aspect (1) described above, it is preferable to further include a flow channel member overlapped in a thickness direction crossing the second direction viewed from the first direction in the actuator plate, wherein the opposed surface is a surface of the actuator plate which faces to the first direction, and the flow channel member includes a circulation channel which is provided to a portion located between the non jet channel and the opposed surface in the first direction, and is individually communicated with the jet channel, an entrance flow channel which is provided to a portion located at an opposite side to the opposed surface in the first direction with respect to the circulation channel, and is communicated with the jet channel, and an exit flow channel communicated with a plurality of the circulation channels in a lump.

According to the present aspect, since the non jet channel is not opened on the opposed surface, it is possible to ensure the circulation channel large in dimension in the second direction, and it is easy to ensure the flow channel cross-sectional area of the circulation channel. In this case, since it is possible to increase the flow rate of the liquid flowing through the circulation channel, it is possible to achieve suppression of clogging with a bubble in the jet orifice, and an increase in jet amount of the liquid through the jet orifice. Further, the pressure fluctuation generated in one of the jet channels when, for example, jetting the liquid is easily dissipated in the circulation channel. Therefore, even when the plurality of jet channels are communicated with each other through the exit flow channel, it is possible to suppress a so-called cross talk in which the pressure fluctuation generated in one of the jet channels propagates to other jet channels through the circulation channels and the exit flow channel.

On the other hand, since it is possible to ensure the circulation channel large in dimension in the second direction, it is possible to suppress the thickness (the dimension in the first direction) of the intermediate plate while ensuring the flow channel cross-sectional area of the circulation channel. Therefore, it is possible to effectively propagate the pressure fluctuation generated in the jet channel when jetting the liquid to the jet orifice.

As a result, the jet performance can be improved.

(5) In the head chip according to the aspect (4) described above, it is preferable that a flow channel cross-sectional area of the circulation channel increases as getting away from the jet channel.

According to the present aspect, since it is possible to increase the flow channel cross-sectional area of the circulation channel, it is possible to achieve suppression of clogging with a bubble in the jet orifice, and an increase in jet amount of the liquid through the jet orifice.

Further, the pressure fluctuation generated in one of the jet channels when, for example, jetting the liquid is easily dissipated in the circulation channel, and therefore, it is possible to suppress the cross talk.

(6) In the head chip according to one of the aspects (4) and (5) described above, it is preferable that an end surface of the non jet channel at the opposed surface side is formed as an inclined surface which extends in a direction of getting away from the flow channel member in the thickness direction as getting closer to the opposed surface in the first direction.

According to the present aspect, it is easy to ensure the area of a portion located between the end surface of the non jet channel and the opposed surface on the surface to be overlapped on the flow channel member in the actuator plate. Therefore, it is possible to ensure the circulation channel large in flow channel cross-sectional area. Thus, since it is possible to increase the circulation flow rate of the liquid inside the head chip, it is possible to achieve suppression of clogging with a bubble in the jet orifice, and an increase in jet amount of the liquid through the jet orifice.

Further, the pressure fluctuation generated in one of the jet channels when, for example, jetting the liquid is easily dissipated in the circulation channel, and therefore, it is possible to suppress the cross talk.

(7) In the head chip according to any of the aspects (4) through (6) described above, it is preferable that the circulation channel is disposed at a position separated from the opposed surface in a portion located between the non-jet channel and the opposed surface in the first direction, in the flow channel member.

According to the present aspect, since the circulation channel is not opened on the end surface facing to the first direction in the flow channel member, the whole of the end surface of the flow channel member forms a flat continuous surface. Therefore, it becomes easy to ensure the bonding area between the end surface of the flow channel member and the jet orifice plate, and thus, it is possible to ensure the bonding strength. As a result, it is easy to ensure the durability of the head chip.

(8) In the head chip according to any of the aspects (1) through (7) described above, it is preferable that an end surface of the non jet channel at the opposed surface side includes a first inclined surface extending in a direction of getting away from the opposed surface in the first direction as getting away from a first surface facing to a thickness direction crossing the second direction viewed from the first direction, in the actuator plate, and a second inclined surface which gets away from the opposed surface in the first direction as getting away from a second surface located oppositely to the first surface in the thickness direction, in the actuator plate, and connects to the first inclined surface.

According to the present aspect, it is possible to suppress the maximum dimension between the end surface of the non-jet channel and the opposed surface compared to when forming the non jet channel by, for example, making the dicer enter the actuator plate only from one surface. As a result, it is possible to ensure the opposed area in the second direction between the jet channel and the non-jet channel. Therefore, since it is possible to ensure the opposed area between the electrodes respectively formed on inner surfaces of the jet channel and the non-jet channel, it is possible to ensure the pump stroke to increase the deformation volume of the drive wall when jetting the liquid. By increasing the deformation volume of the drive wall, it is possible to decrease the application voltage for achieving the same jet action. Further, an improvement in jet performance such as an increase in jetting speed can be expected in the case of the same application voltage.

(9) The liquid jet head according to an aspect of the present disclosure includes the head chip according to any of the aspects (1) through (9) described above.

According to the present aspect, since the head chip according to the aspect described above is provided, it is possible to provide the liquid jet head excellent in reliability.

(10) A liquid jet recording device according to an aspect of the present disclosure includes the liquid jet head according to the aspect (9) described above.

According to the present aspect, since the head chip according to the aspect described above is provided, it is possible to provide the liquid jet recording device excellent in reliability.

According to an aspect of the present disclosure, it is possible to provide the head chip, the liquid jet head, and the liquid jet recording device each capable of ensuring an electrical reliability, and enhancing the durability.

DETAILED DESCRIPTION OF THE PREFERRED EMBODIMENTS

Figure 1:
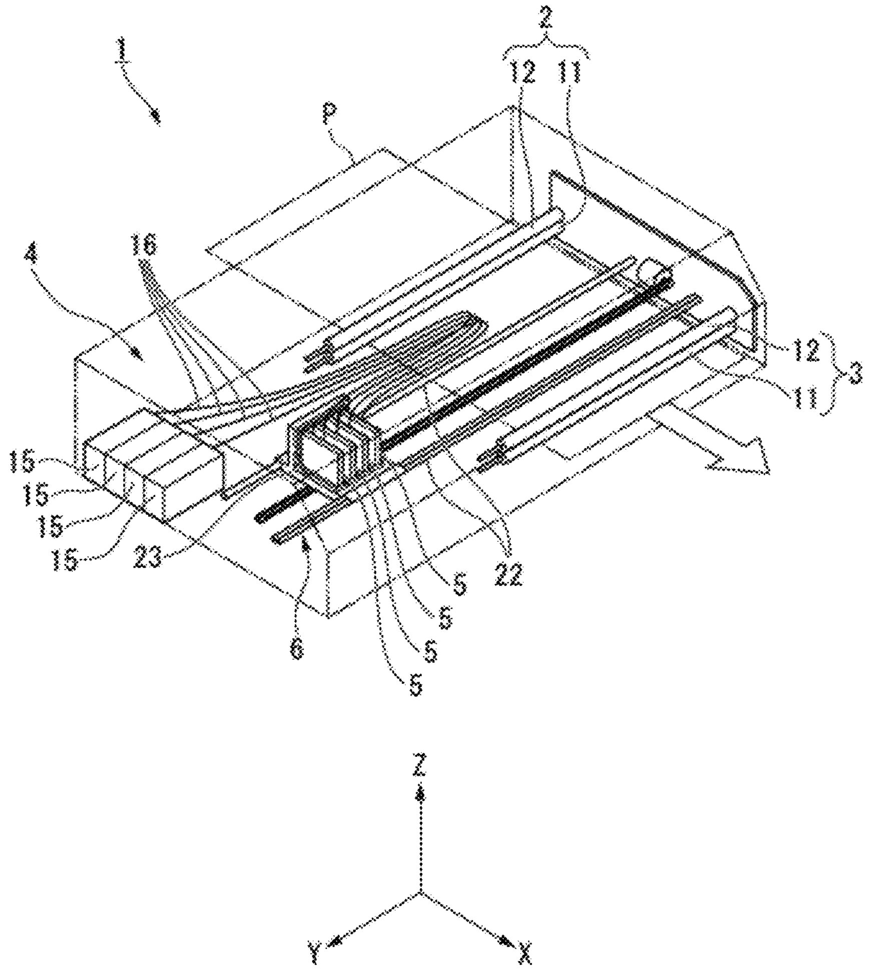
FIG. 1 is a schematic configuration diagram of an inkjet printer according to a first embodiment.

Some embodiments according to the present disclosure will hereinafter be described with reference to the drawings. In the embodiments and modified examples described hereinafter, constituents corresponding to each other are denoted by the same reference symbols and the description thereof will be omitted in some cases. It should be noted that in the following description, expressions representing relative or absolute arrangement such as "parallel," "perpendicular," "center," and "coaxial" not only represent strictly such an arrangement, but also represent the state of being relatively displaced with a tolerance, or an angle or a distance to the extent that the same function can be obtained. In the following embodiments, the description will be presented citing an inkjet printer (hereinafter simply referred to as a printer) for performing recording on a recording target medium using ink (liquid) as an example. It should be noted that the scale size of each member is arbitrarily modified so as to provide a recognizable size to the member in the drawings used in the following description.

First Embodiment

[Printer 1]

FIG. 1 is a schematic configuration diagram of a printer 1.

As shown in FIG. 1, the printer (a liquid jet recording device) 1 according to a first embodiment is provided with a pair of conveying mechanisms 2, 3, an ink supply mechanism 4, inkjet heads (a liquid jet head) 5, and a scanning mechanism 6.

In the following explanation, the description is presented using an orthogonal coordinate system of X, Y, and Z as needed. In this case, the X direction coincides with the conveying direction (a sub-scanning direction) of a recording target medium P (e.g., paper). The Y direction coincides with a scanning direction (a main scanning direction) of the scanning mechanism 6. The Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink supply mechanism 4 is provided with ink tanks 15 each containing the ink, and ink pipes 16 for respectively connecting the ink tanks 15 and the inkjet heads 5 to each other. The ink tanks 15 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink in accordance with the ink tanks 15 coupled thereto. It should be noted that water-based ink using water as a solvent can be used as the ink.

The scanning mechanism 6 makes the inkjet heads 5 perform reciprocal scan in the Y direction. The scanning mechanism 6 is provided with a guide rail 22, and a carriage 23 supported by the guide rail 22 so as to be able to move in the Y direction. The inkjet heads 5 reciprocally move in the Y direction in a state of being mounted on the carriage 23 when performing a print operation on the recording target medium P.

<Inkjet Heads 5>

As shown in FIG. 1, the inkjet heads 5 are mounted on the single carriage 23 so as to be arranged side by side in the Y direction. The inkjet heads 5 are each provided with a head chip 50 (see FIG. 2), an ink supply section (not shown) for coupling the ink tank 15 and the head chip 50 to each other, and a control section (not shown) for applying drive voltages to the head chip 50.

<Head Chip 50>

Figure 2:
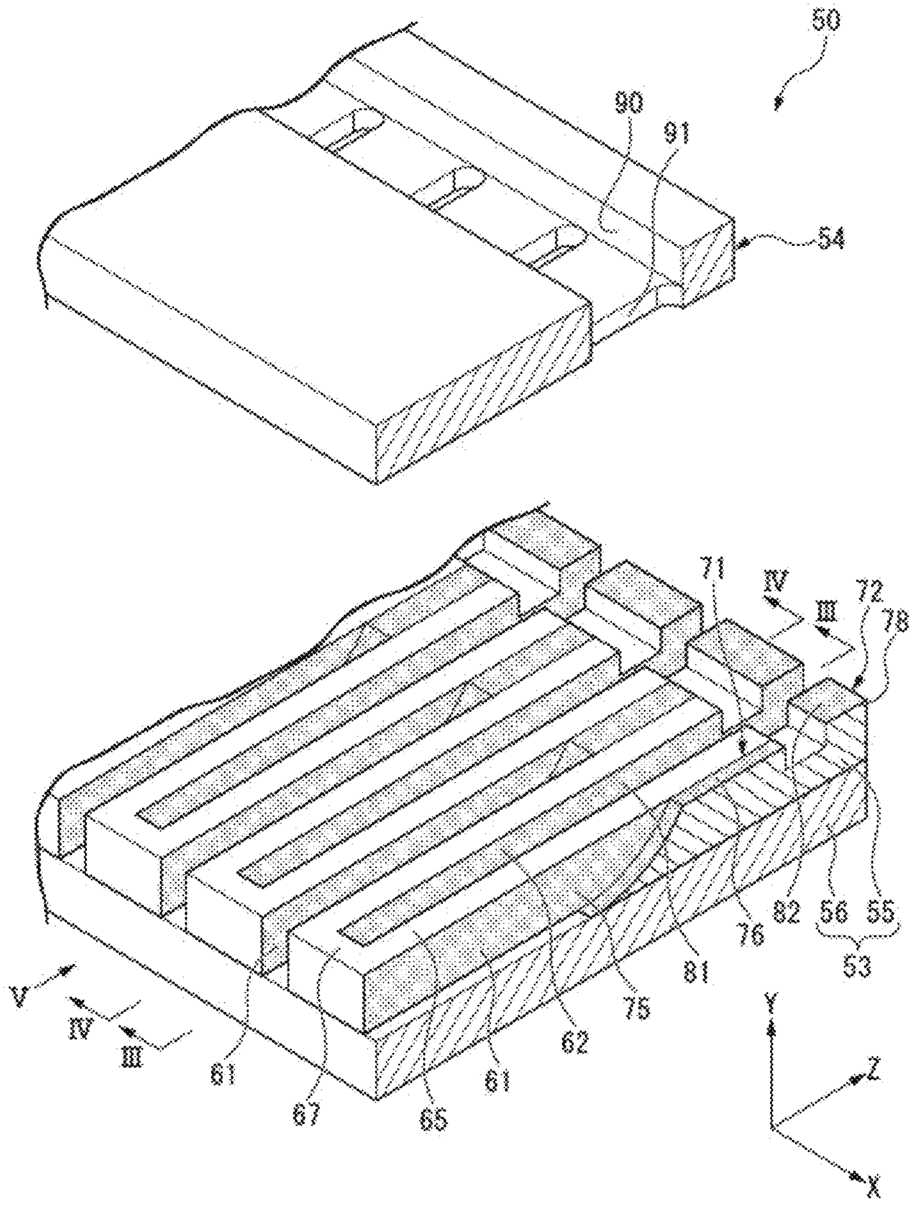
FIG. 2 is an exploded perspective view of a head chip according to the first embodiment.

FIG. 2 is an exploded perspective view of the head chip 50.

The head chip 50 is a so-called edge-shoot type head chip 50 for ejecting the ink from an edge in the extending direction (the Z direction) of ejection channels 61 described later. The head chip 50 is provided with a nozzle plate 51 (see FIG. 4), an actuator plate 53, and a cover plate (a flow channel member) 54.

The actuator plate 53 has a configuration in which a drive plate 55 and a back plate 56 are overlapped with each other in the Y direction. The drive plate 55 and the back plate 56 are each formed of a piezoelectric material such as PZT (lead zirconate titanate). The drive plate 55 has a configuration (a so-called chevron type) in which, for example, two piezoelectric plates different in polarization direction in the Y direction are stacked on one another. It should be noted that in the actuator plate 53, the back plate 56 can be formed of a material other than the piezoelectric material providing at least the drive plate 55 is formed of the piezoelectric material. Further, the actuator plate 53 can be formed of a single piezoelectric plate having the polarization direction unidirectional in the entire area in the Y direction (the thickness direction) (a so-called monopole type).

The actuator plate 53 is provided with the ejection channels (jet channels) 61 each filled with the ink, and non-ejection channels (non-jet channels) 62 not filled with the ink. Each of the channels 61, 62 is formed by making, for example, a dicer having a disk-like shape enter the actuator plate 53 in the Y direction. The channels 61, 62 are alternately arranged at intervals in the X direction (a second direction) in the actuator plate 53. It should be noted that the configuration in which the channel extension direction coincides with the Z direction (a first direction) will be described in the present embodiment, but the channel extension direction can cross the Z direction.

Figure 3:
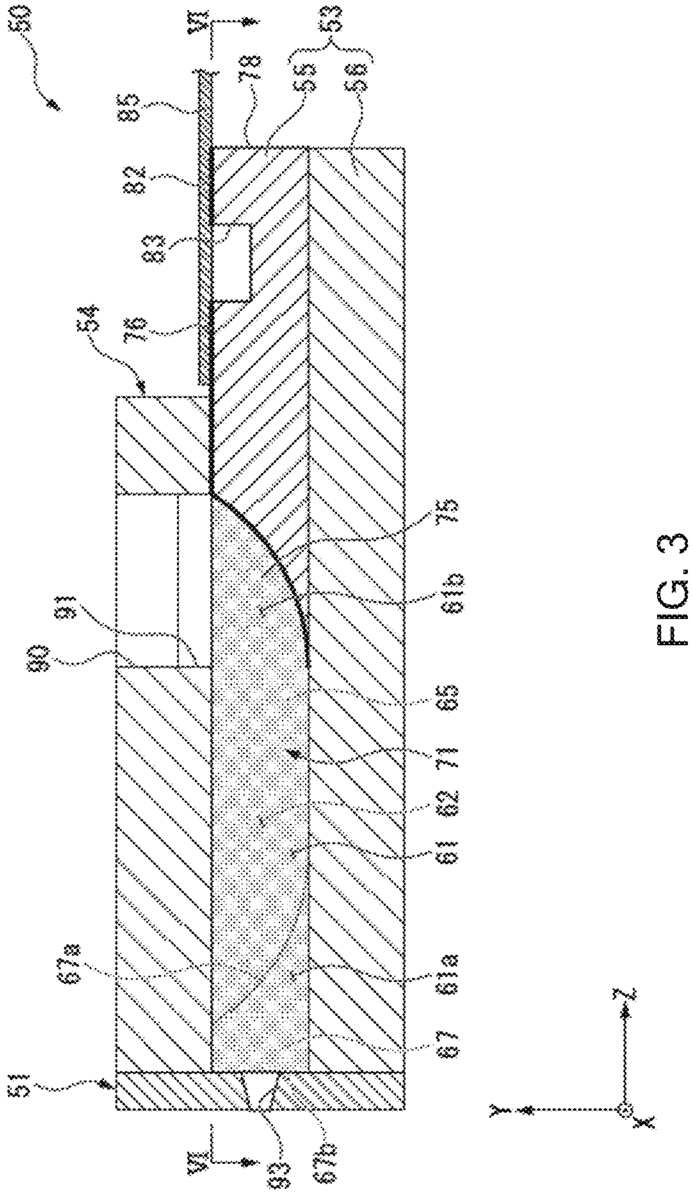
FIG. 3 is a cross-sectional view corresponding to the line III-III shown in FIG. 2.

FIG. 3 is a cross-sectional view corresponding to the line III-III shown in FIG. 2. In the following explanation, the description will be presented defining the +Y side as an obverse surface side, the −Y side as a reverse surface side, the +Z side as an upper side, and the −Z side as a lower side.

As shown in FIG. 3, the ejection channel 61 opens on the obverse surface of the actuator plate 53, and at the same time, extends in the Z direction. The ejection channel 61 is provided with an extending part 61*a* and an uprise part 61*b*.

The extending part 61*a* is a portion uniform in depth in the Y direction. A lower end of the extending part 61*a* is opened on a lower end surface of the actuator plate 53. It should be noted that in the present embodiment, the extending part 61*a* penetrates the drive plate 55 in the Y direction. Therefore, a bottom surface of the extending part 61*a* is formed of an obverse surface of the back plate 56.

The uprise part 61*b* is connected to an upper end of the extending part 61*a*. The uprise part 61*b* gradually becomes shallower in depth in the Y direction along an upward direction. Specifically, a bottom surface of the uprise part 61*b* is formed as an inclined surface which extends while curving toward the obverse surface along an upward direction.

Figure 4:
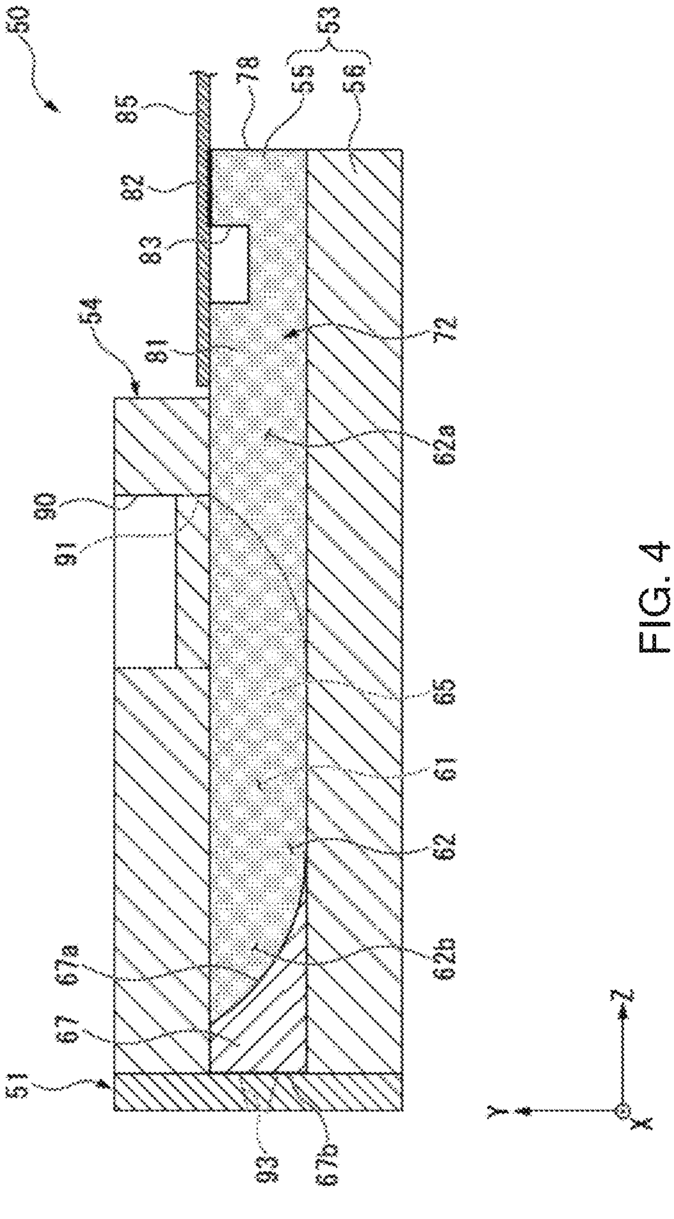
FIG. 4 is a cross-sectional view along the line IV-IV shown in FIG. 2.

FIG. 4 is a cross-sectional view along the line IV-IV shown in FIG. 2.

As shown in FIG. 4, the non-ejection channel 62 opens on the obverse surface of the actuator plate 53, and at the same time, extends in the Z direction. The non-ejection channel 62 is provided with an extending part 62*a* and an uprise part 62*b*.

The extending part 62*a* is a portion uniform in depth in the Y direction. An upper end of the extending part 62*a* is opened on an upper end surface of the actuator plate 53. In the present embodiment, the extending part 62*a* penetrates the drive plate 55 in the Y direction. Therefore, a bottom surface of the extending part 62*a* is formed of the obverse surface of the back plate 56.

The uprise part 62*b* is connected to a lower end of the extending part 62*a*. The uprise part 62*b* gradually becomes shallower in depth in the Y direction along a downward direction. A bottom surface (an end surface at an opposed surface side of the non jet channel) of the uprise part 62*b* is formed as an inclined surface which extends while curving toward the obverse surface along a downward direction.

Figure 5:
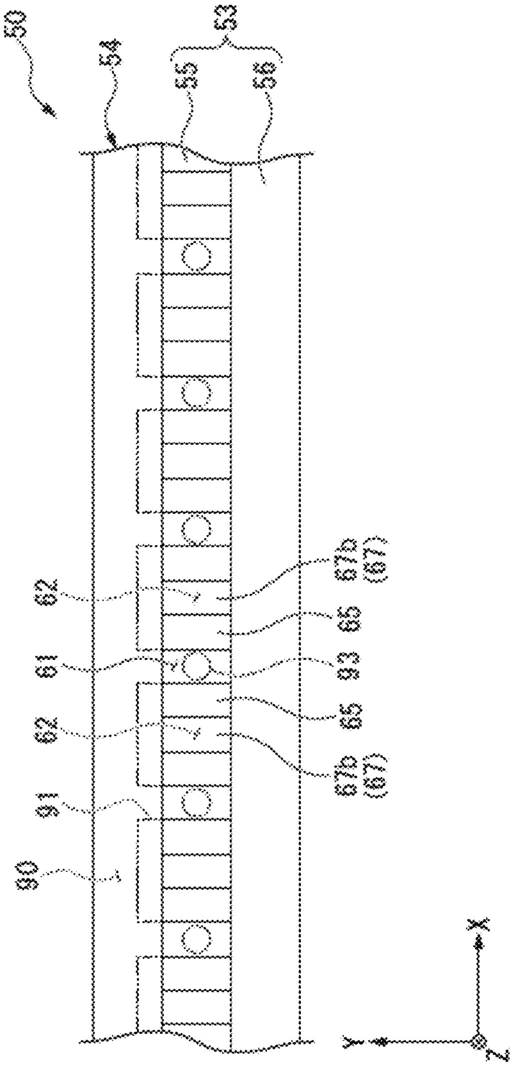
FIG. 5 is a front view corresponding to a view from the arrow V shown in FIG. 2.

FIG. 5 is a front view corresponding to a view from the arrow V shown in FIG. 2.

As shown in FIG. 2 and FIG. 5, in the actuator plate 53, a portion located between each of the ejection channel 61 and corresponding one of the non-jet channels 62 constitutes a drive wall 65. Therefore, both sides in the X direction of the ejection channel 61 are surrounded by the pair of drive walls 65.

As shown in FIG. 4, in the actuator plate 53, a portion located between a lower end surface of the actuator plate 53 (an opposed surface to the nozzle plate 51) and the non jet channel 62 (the bottom surface) constitutes a blocking part 67. The blocking part 67 blocks the communication between inside and outside of the non-ejection channel 62 in the Z direction. Therefore, the non-ejection channel 62 is terminated at a position at a distance upward from the lower end surface of the actuator plate 53, and is not opened on the lower end surface of the actuator plate 53.

In the blocking part 67, a surface (hereinafter referred to as a blocking inner-surface part 67*a*) exposed inside the non-ejection channel 62 constitutes the bottom surface of the uprise part 62*b*. In contrast, in the blocking part 67, a surface (hereinafter referred to as a blocking outer-surface part 67*b*) facing to an opposite side to the non-ejection channel 62 constitutes the lower end surface of the actuator plate 53. Therefore, in the present embodiment, a dimension in the Z direction of the blocking part 67 gradually increases from an obverse surface side to a reverse surface side. It should be noted that the blocking outer-surface part 67*b* is not limited to when being coplanar with the lower end surface of the actuator plate 53. The blocking outer-surface part 67*b* can be recessed upward with respect to, for example, the lower end surface of the actuator plate 53.

Figure 6:
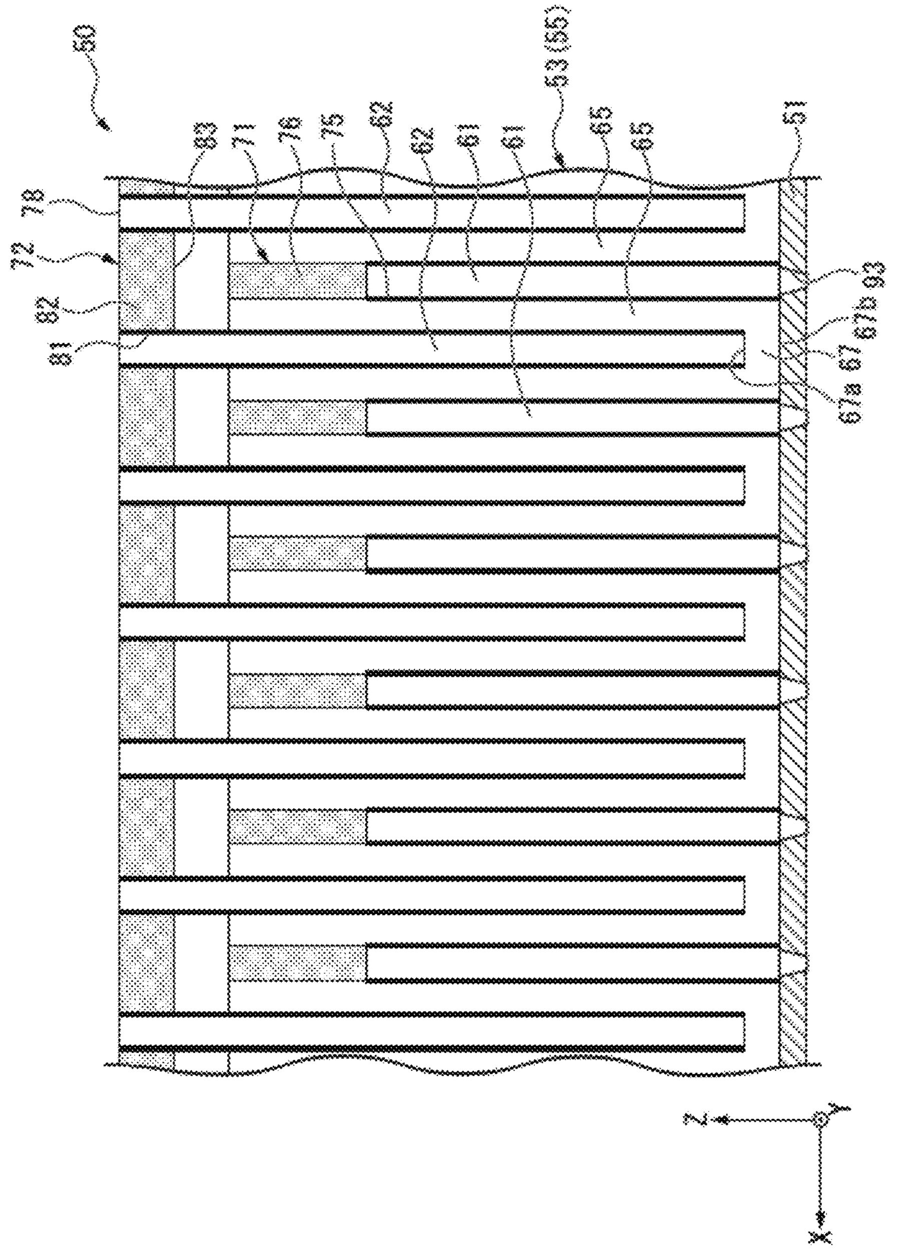
FIG. 6 is a cross-sectional view corresponding to the line VI-VI shown in FIG. 3.

FIG. 6 is a plan view of the actuator plate 53.

As shown in FIG. 6, the actuator plate 53 is provided with common wiring 71 and individual wiring 72. The common wiring 71 is provided with common electrodes 75 and common terminals 76.

The common electrodes 75 are each formed on an inner surface of the ejection channel 61. The common electrodes 75 are each formed over the entire area of the inner side surfaces opposed to each other in the X direction, and the bottom surface of the uprise part 61*b* in the inner surface of the ejection channel 61.

The common terminals 76 are each formed on an obverse surface of a portion (hereinafter referred to as a tail part 78) located at an upper side of the ejection channel 61 out of the actuator plate 53. The common terminal 76 is formed on the obverse surface of the tail part 78 so as to have a slip-like shape extending in the Z direction. The common terminals 76 are each coupled to the common electrodes 75 at an obverse surface-side opening edge of the ejection channel 61.

The individual wiring 72 is provided with individual electrodes 81 and individual terminals 82.

The individual electrodes 81 are each formed on an inner side surface facing the non-ejection channel 62 out of the drive wall 65. The individual electrodes 81 are each formed over the entire area in the Y direction on the inner side surface of corresponding one of the non-ejection channels 62. It should be noted that the individual electrodes 81 formed on the inner side surfaces opposed to each other out of the inner surface of the non-ejection channel 62 are separated from each other on the bottom surface of the non-ejection channel 62.

The individual terminal 82 is provided to a portion located at an upper side of the common terminal 76 on the obverse surface of the tail part 78. The individual terminal 82 is provided with a strip-like shape extending in the X direction. The individual terminal 82 couples the individual electrodes 81 opposed to each other in the X direction across the ejection channel 61 at obverse surface-side opening edges of the non-ejection channels 62 which are opposed to each other in the X direction across the ejection channel 61. It should be noted that when using a monopole type as the actuator plate 53, it is necessary to form the common electrodes 75 and the individual electrodes 81 on the inner side surfaces of the corresponding channels 61, 62 to have a depth which is no smaller than a half of the inner side surface in the Y direction from the obverse surface side, and with which the electrode does not reach the bottom surface of the channels 61, 62.

It should be noted that in the tail part 78, a portion located between the common terminal 76 and the individual terminal 82 is provided with a compartment groove 83. The compartment groove 83 opens on the obverse surface of the tail part 78, and at the same time, extends in the X direction. The compartment grooves 83 each separate the common terminal 76 and the individual terminal 82 from each other.

As shown in FIG. 4 through FIG. 6, a flexible printed board 85 is pressure-bonded to the obverse surface of the tail part 78. The flexible printed board 85 is coupled to the common terminals 76 and the individual terminals 82 on the obverse surface of the tail part 78. The flexible printed board 85 is pulled out upward.

<Cover Plate 54>

As shown in FIG. 2 through FIG. 4, the cover plate 54 is fixed to the obverse surface (the surface other than the opposed surface) of the actuator plate 53 with an adhesive or the like. Specifically, the cover plate 54 is disposed with the thickness direction set to the Y direction. The cover plate 54 closes the obverse surface-side opening parts of the respective channels 61, 62 in a state of exposing the obverse surface of the tail part 78. In the Z direction, a lower end surface of the cover plate 54 is disposed coplanar with the lower end surface of the actuator plate 53.

In the cover plate 54, at a position overlapping the upper end portions of the ejection channels 61 viewed from the Y direction, there is formed an entrance common ink chamber (an entrance flow channel) 90. The entrance common ink chamber 90 extends in the X direction with a length sufficient for straddling, for example, the channels 61, 62, and at the same time, opens on the obverse surface of the cover plate 54.

In the entrance common ink chamber 90, at positions overlapping the respective ejection channels 61 viewed from the Y direction, there are formed entrance slits (the entrance flow channel) 91. The entrance slits 91 each communicate the upper end portion of corresponding one of the ejection channels 61 and the entrance common ink chamber 90 with each other. The entrance slits 91 each face the uprise part 61*b* in the Y direction. Therefore, the entrance slits 91 are communicated with the respective ejection channels 61 on the one hand, but are not communicated with the non-ejection channels 62 on the other hand.

As shown in FIG. 4, the nozzle plate 51 is fixed to the lower end surface of the actuator plate 53 with an adhesive or the like. The nozzle plate 51 is disposed with the thickness direction set to the Z direction, and with the longitudinal direction set to the X direction. In the present embodiment, the nozzle plate 51 is formed of a resin material such as polyimide so as to have a thickness of about 50 μm. It should be noted that it is possible for the nozzle plate 51 to have a single layer structure or a laminate structure with a metal material (SUS, Ni—Pd, or the like), glass, silicone, or the like besides the resin material.

The nozzle plate (a jet orifice plate) 51 is provided with nozzle holes (jet orifices) 93 described above penetrating the nozzle plate 51 in the Z direction. The nozzle holes 93 are independently formed at positions opposed in the Z direction to the respective ejection channels 61 in the nozzle plate 51. It should be noted that each of the nozzle holes 93 is formed to have a taper shape gradually tapering along a direction from the upper side toward the lower side.

[Operation Method of Printer 1]

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is created the state in which the inkjet heads 5 are filled with the ink in the ink tanks 15 through the ink pipes 16, respectively.

Under such an initial state, when making the printer 1 operate, the recording target medium P is conveyed toward the +X side while being pinched by the rollers 11, 12 of the conveying mechanisms 2, 3. Further, by the carriage 23 moving in the Y direction at the same time, the inkjet heads 5 mounted on the carriage 23 reciprocate in the Y direction.

During the reciprocation of the inkjet heads 5, the ink is arbitrarily ejected toward the recording target medium P from each of the inkjet heads 5. Thus, it is possible to perform recording of the character, the image, and the like on the recording target medium P.

When the reciprocation of the inkjet head 5 is started due to the translation of the carriage 23 (see FIG. 1), the drive voltages are applied between the common electrodes 75, and the individual electrodes 81 via the flexible printed boards 85. On this occasion, the individual electrodes 81 are set at a drive potential Vdd, and the common electrodes 75 are set at a reference potential GND to apply the drive voltage between the electrodes. Then, a thickness-shear deformation is caused in each of the drive walls 65 due to a so-called inverse piezoelectric effect, and thus, the drive walls 65 each make a flexural deformation so as to form a V-shape taking a central portion in the Y direction as a starting point. In other words, the drive walls 65 deform so that the volume of the ejection channel 61 increases.

After the volume of each of the ejection channels 61 has increased, the voltage applied between the common electrodes 75 and the individual electrodes 81 is set to zero. Then, the drive walls 65 are restored, and the volume of the ejection channel 61 having once increased is restored to the original volume. Thus, the internal pressure of the ejection channel 61 increases to pressure the ink. Then, a pressure wave generated due to the increase in pressure in the ejection channel 61 propagates toward the nozzle hole 93. As a result, the ink in the ejection channel 61 is ejected as a droplet through the nozzle hole 93. By the ink ejected from the nozzle hole 93 landing on the recording target medium P, it is possible to record the character, the image, and the like on the recording target medium P.

<Method of Manufacturing Head Chip 50>

Figure 7:
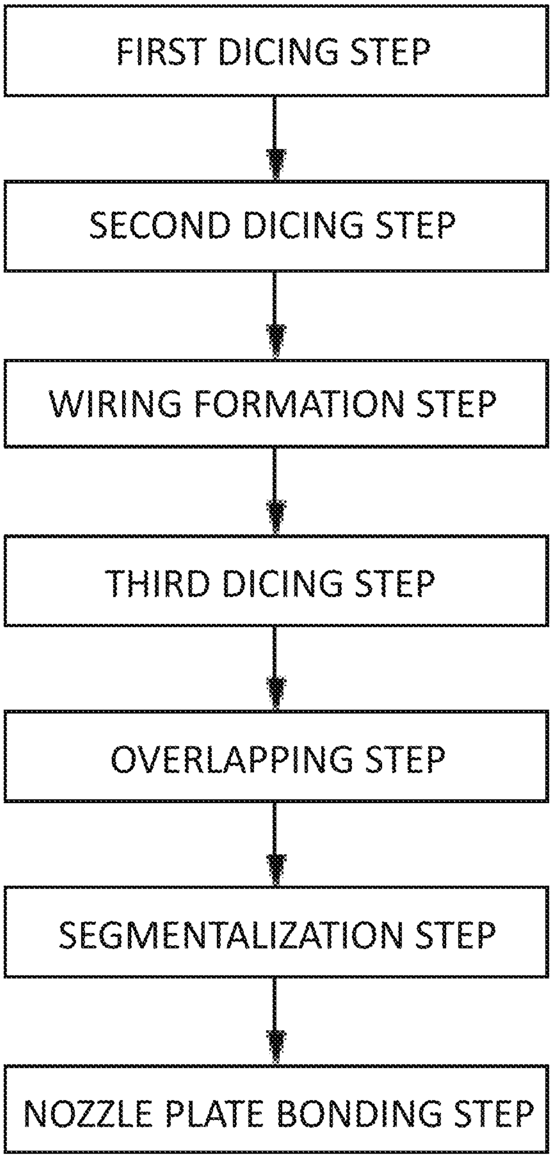
FIG. 7 is a flowchart for explaining a method of manufacturing the head chip according to the first embodiment.

Then, a method of manufacturing such a head chip 50 as described above will briefly be described. FIG. 7 is a flowchart for explaining the method of manufacturing the head chip 50. FIG. 8 through FIG. 11 are diagrams for explaining steps of the method of manufacturing the head chip 50. In the present embodiment, a method of manufacturing a plurality of head chips 50 in a lump wafer by wafer will be described.

As shown in FIG. 7, the head chip 50 is manufactured through, for example, a first dicing step, a second dicing step, a wiring formation step, a third dicing step, an overlapping step, a segmentalization step, and a nozzle plate bonding step.

Figure 8:
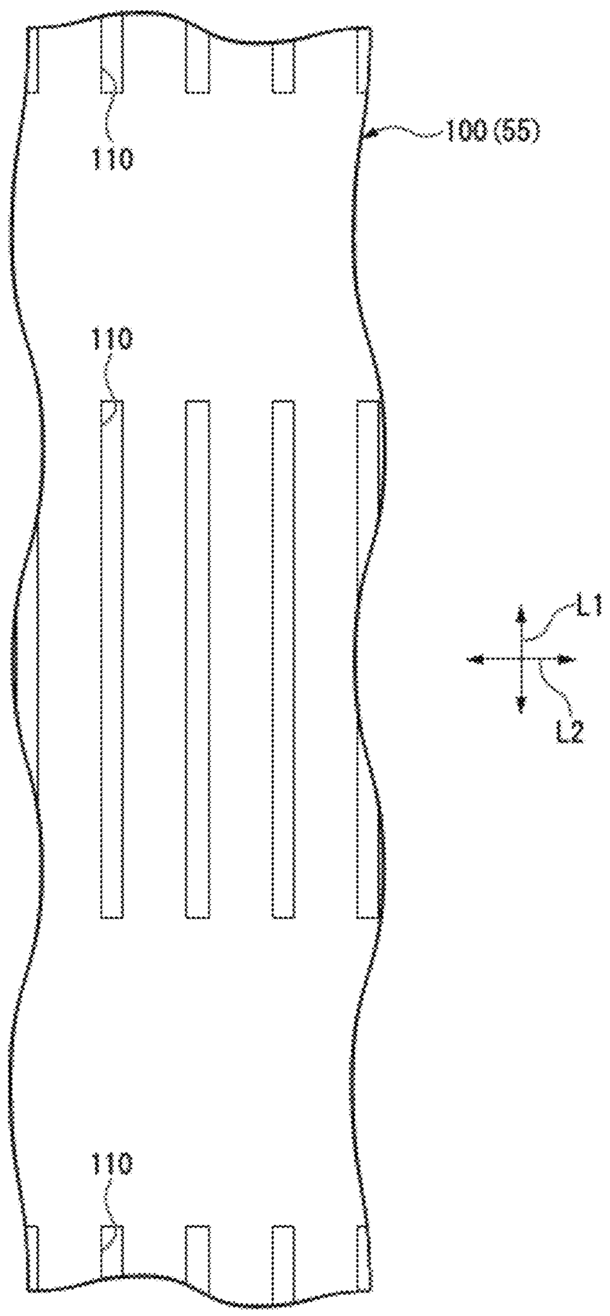
FIG. 8 is a diagram for explaining a step of the method of manufacturing the head chip according to the first embodiment.

As shown in FIG. 8, in the first dicing step, first dicing lines 110 which will turn to the ejection channels 61 later are provided to a drive wafer 100 which will turn to the drive plates 55 later. Specifically, a dicer is made to enter the drive wafer 100 from the obverse surface side, and then the dicer is made to run as much as a predetermined amount. A length (a running amount of the dicer) along an extending direction L1 of the first dicing lines 110 is set to a length about twice as long as the ejection channel 61. Therefore, in each of the first dicing lines 110, both end portions in the extending direction L1 turn to portions each functioning as the uprise part 61*b* of the ejection channel 61, and a central portion in the extending direction L1 turns to a portion functioning as the extending part 61*a*. In the first dicing step, the operation described above is repeatedly performed at a distance in the extending direction L1 and a crossing direction (hereinafter referred to as a crossing direction L2) crossing the extending direction L1 with respect to the drive wafer 100.

Figure 9:
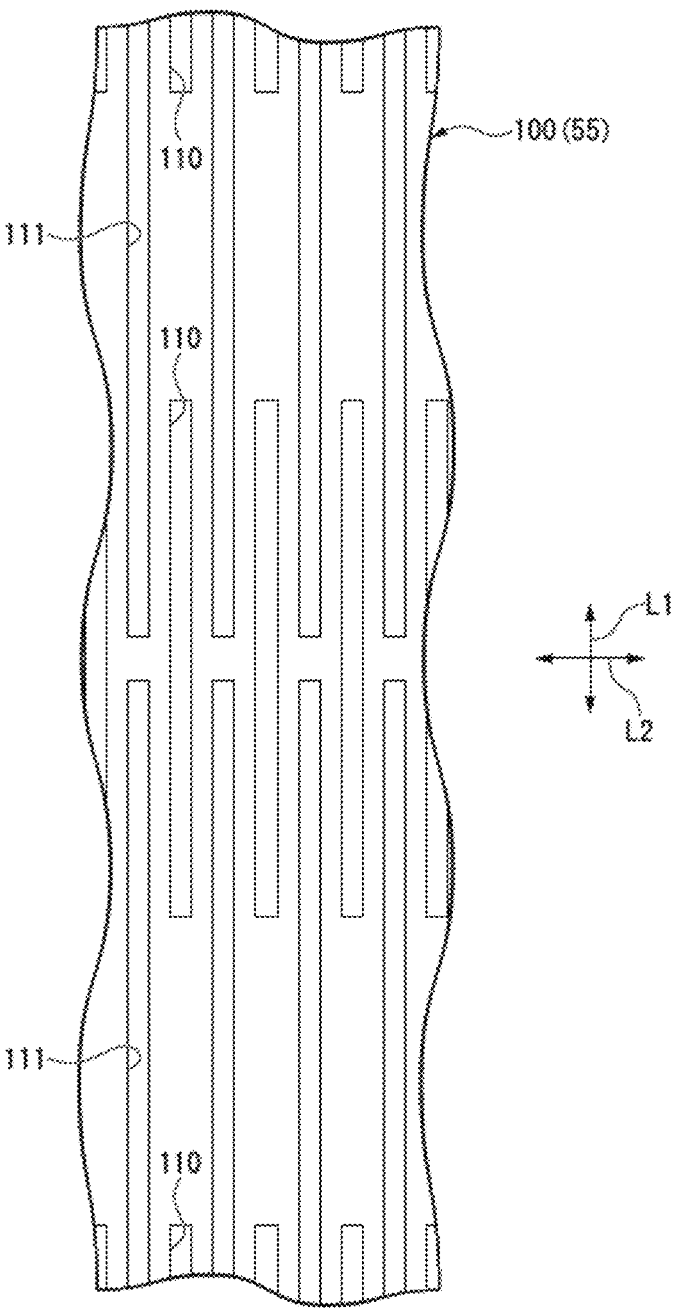
FIG. 9 is a diagram for explaining a step of the method of manufacturing the head chip according to the first embodiment.

As shown in FIG. 9, in the second dicing step, there are formed second dicing lines 111 which will turn to the non-ejection channels 62 later. Specifically, the dicer is made to enter portions located at both sides in the X direction with respect to each of the first dicing lines 110 in the drive wafer 100, and then the dicer is made to run as much as a predetermined amount. A length (a running amount of the dicer) along the extending direction L1 of the second dicing lines 111 is set to a length about twice as long as the non-ejection channel 62. Therefore, in each of the second dicing lines 111, both end portions in the extending direction L1 turn to portions each functioning as the uprise part 62*b* of the non-ejection channel 62, and a central portion in the extending direction L1 turns to a portion functioning as the extending part 62*a*. Further, the second dicing lines 111 are formed in the state of being shifted as much as a half pitch with respect to the first dicing lines 110. In other words, the second dicing lines 111 are formed so that the end portion in the extending direction L1 in the second dicing line 111 and the central portion in the extending direction L1 in the first dicing line 110 are arranged at the same position in the extending direction L1.

In the wiring formation step, the common wiring 71 and the individual wiring 72 are provided to the drive wafer 100. Specifically, an electrode material is deposited from an obverse surface side and a reverse surface side of the drive wafer 100 using oblique vapor deposition or the like. Thus, the wiring 71 and the wiring 72 are formed on the obverse surface of the drive wafer 100 and the inner surfaces of the dicing lines 110, 111 through a mask pattern not shown.

Figure 10:
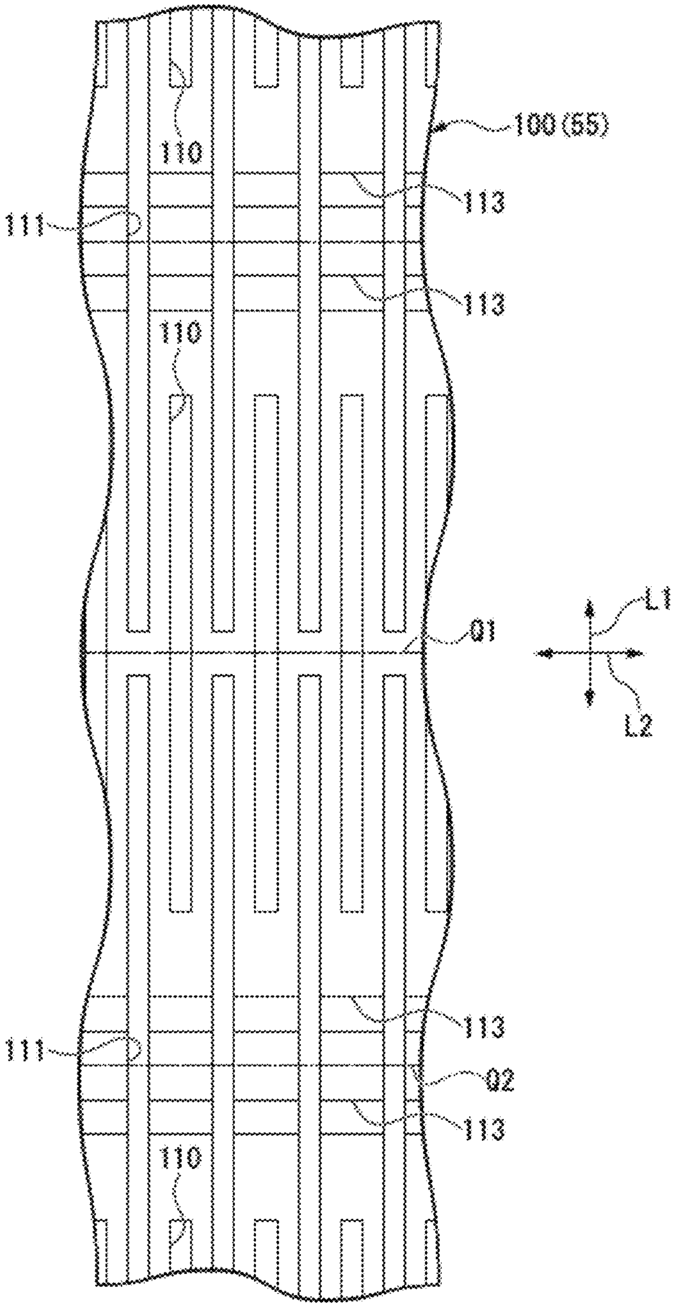
FIG. 10 is a diagram for explaining a step of the method of manufacturing the head chip according to the first embodiment.

As shown in FIG. 10, in the third dicing step, there are formed third dicing lines 113 which will turn to the compartment grooves 83 later. Specifically, in the drive wafer 100, the dicer is made to enter the portions located between the first dicing lines 110 adjacent to each other in the extending direction L1 in the drive wafer 100 from the obverse surface side of the drive wafer 100, and then the dicer is made to run in the crossing direction L2.

In the overlapping step, a back wafer (not shown) which will turn to the back plate 56 later is stacked at the reverse surface side of the drive wafer 100. Further, at the obverse surface side of the drive wafer 100, there is stacked a cover wafer (not shown) which will turn to the cover plate 54 later. Thus, a wafer assembly having the drive wafer 100, the back wafer, and the cover wafer stacked on one another is formed.

Figure 11:
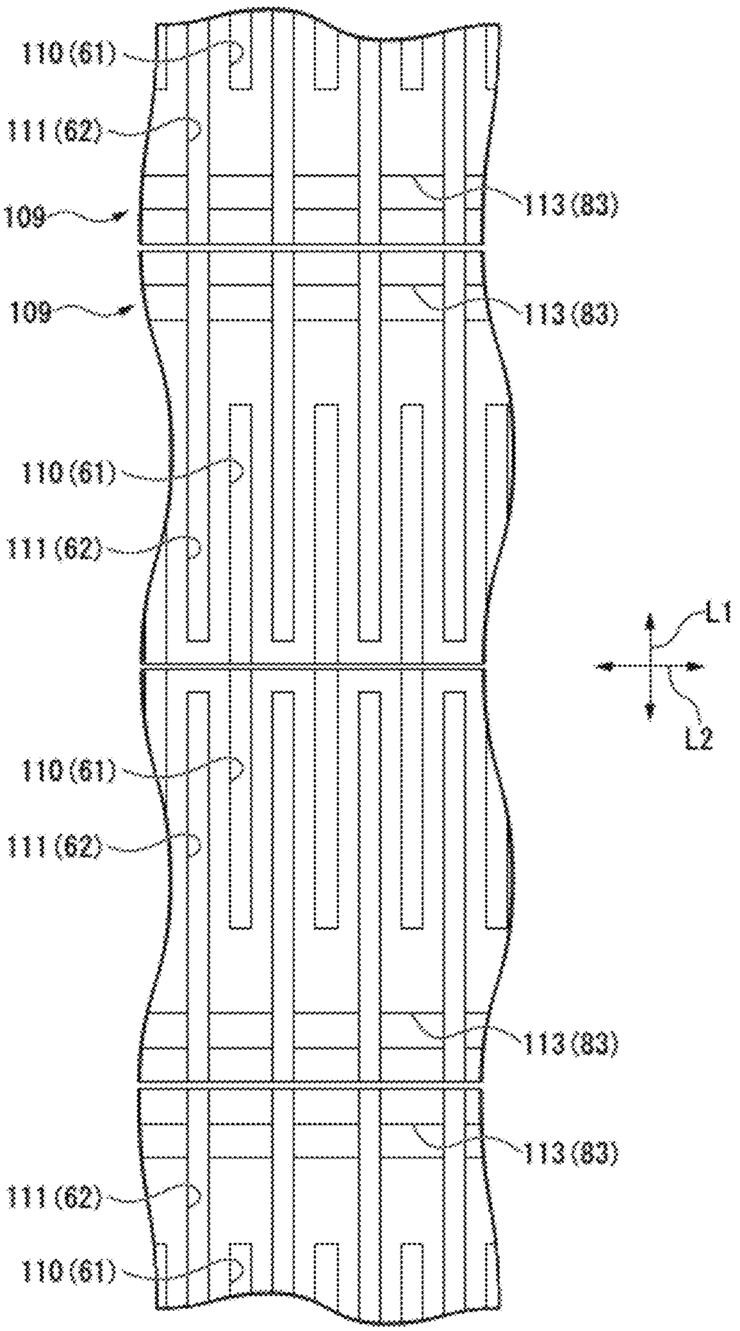
FIG. 11 is a diagram for explaining a step of the method of manufacturing the head chip according to the first embodiment.

As shown in FIG. 11, in the segmentalization step, the wafer assembly is divided into the head chips 50. Specifically, in the wafer assembly, the dicer is made to run in the crossing direction L2 with respect to the central portions (see Q1 in FIG. 10) in the extending direction L1 in the first dicing lines 110, and the portions (see Q2 in FIG. 10) located between the first dicing lines 110 adjacent to each other in the extending direction L1 to thereby cut the wafer assembly. Thus, there is formed a plurality of chip assemblies 109 which are obtained by cutting out the actuator plate 53 and the cover plate 54 described above chip by chip.

In the nozzle plate bonding step, the nozzle plate 51 is bonded to the chip assembly 109 thus cut out in the segmentalization step.

Due to the steps described hereinabove, the head chip 50 is manufactured.

As described above, the head chip 50 according to the present embodiment is assumed to have the configuration in which the non-ejection channels 62 are each terminated at the position at a distance from the lower end surface of the actuator plate 53, and the ejection channels 61 each open on the lower end surface of the actuator plate 53.

According to this configuration, since the non-ejection channel 62 is not opened on the lower end surface of the actuator plate 53, it is possible to prevent the ink located inside the ejection channel 61 from entering the non-ejection channel 62 through a microscopic gap or the like unintentionally formed between the actuator plate 53 and the nozzle plate 51.

Therefore, it is possible to prevent the electrodes formed on the inner surfaces of the non-ejection channels 62 from eroding or shorting, and thus, it is possible to provide the head chip 50 which is excellent in electrical reliability, and in which an improvement in durability is achieved.

Moreover, it is possible to relax the surface texture required for the lower end surface of the actuator plate 53, and therefore, it is possible to achieve an increase in fabrication efficiency and an increase in fabrication yield. In particular, since in the edge-shoot type, the lower end surface (an opening surface of the ejection channel 61) of the actuator plate 53 is formed of a cut surface by the dicer or the like, there is a possibility that unevenness, rolling, or the like occurs on the lower end surface, and it is difficult to make the surface texture high-accuracy. Even in such a case, it is possible to prevent the ink from inflowing into the non-ejection channel 62 while reducing the load applied to the bonding step of the nozzle plate 51.

In the inkjet head 5 and the printer 1 according to the present embodiment, since the head chip 50 described above is provided, it is possible to provide the inkjet head 5 and the printer 1 excellent in reliability.

Modified Example

In the embodiment described above, there is described the configuration in which the dimension in the Z direction of the blocking part 67 gradually increasing along the direction from the obverse surface side toward the reverse surface side of the drive plate 55, but this configuration is not a limitation. It is possible to adopt a configuration in which the dimension in the Z direction of the blocking part 67 gradually increases along a direction from the reverse surface side toward the obverse surface side of the drive plate 55 as shown in, for example, FIG. 12. In other words, in the present modified example, the blocking inner-surface part 67*a* is formed to have an inclined surface extending upward along the direction from the reverse surface side toward the obverse surface side.

Figure 13:
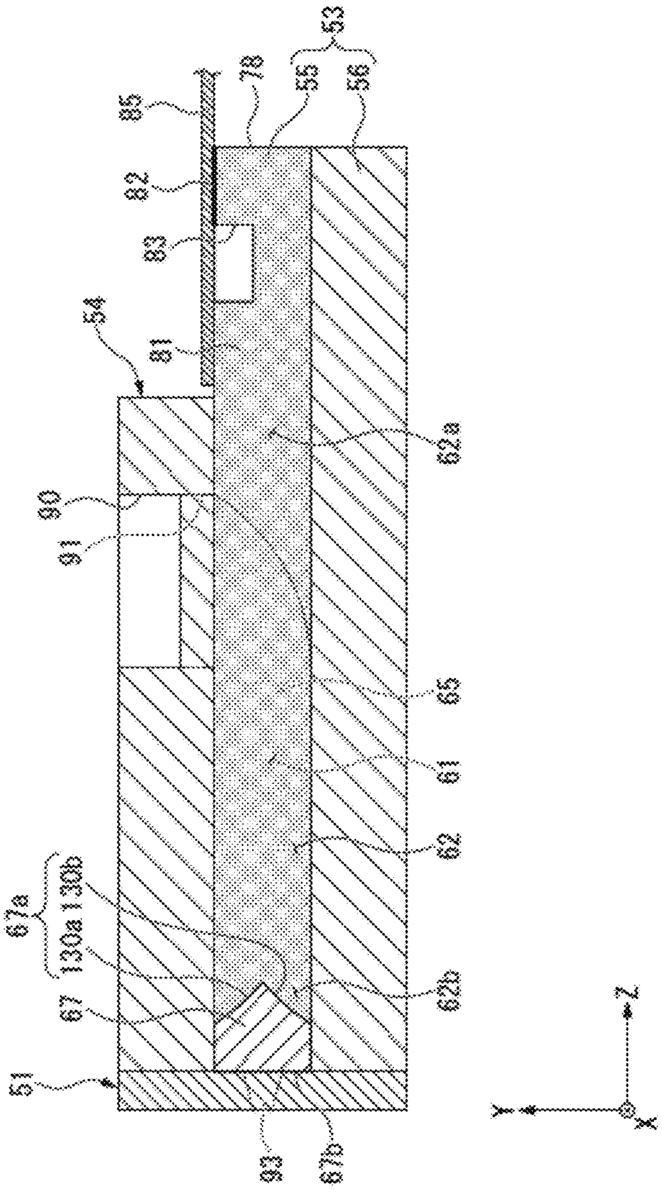
FIG. 13 is a cross-sectional view showing a cross-sectional surface along the non-ejection channel in a head chip according to the modified example.

Further, it is possible to adopt a configuration in which the dimension in the Z direction of the blocking part 67 gradually increases along a direction from the obverse surface side toward the central portion in the Y direction of the drive plate 55, and a direction from the reverse surface side toward the central portion in the Y direction of the drive plate 55 as shown in FIG. 13. Specifically, the blocking inner-surface part 67*a* is provided with a first inclined surface 130*a* extending upward along a direction from the obverse surface side toward the central portion in the Y direction of the drive plate 55, and a second inclined surface 130*b* which extends upward along a direction from the reverse surface side toward the central portion in the Y direction of the drive plate 55, and connects to the first inclined surface 130*a*. The blocking part 67 in the present modified example can be formed by making the dicer enter the drive wafer 100 from the both surfaces thereof in the second dicing step described above.

In the present modified example, it is possible to suppress the maximum dimension (the longest distance between the blocking inner-surface part 67*a* and the blocking outer-surface part 67*b*) in the Z direction in the blocking part 67 compared to when, for example, forming the non-ejection channels 62 by making the dicer enter the actuator plate 53 from one surface. As a result, it is possible to ensure an opposed area (a dimension in the Z direction in the drive wall 65) in the X direction between the ejection channel 61 and the non-ejection channel 62. Therefore, since it is possible to ensure the opposed area between the common electrode 75 and the individual electrode 81, it is possible to ensure a pump stroke to increase a deformation volume of the drive wall 65 when ejecting the ink. By increasing the deformation volume of the drive wall 65, it is possible to decrease the application voltage for achieving the same ejection. Further, an improvement in ejection performance such as an increase in ejection speed can be expected in the case of the same application voltage.

Second Embodiment

Figure 14:
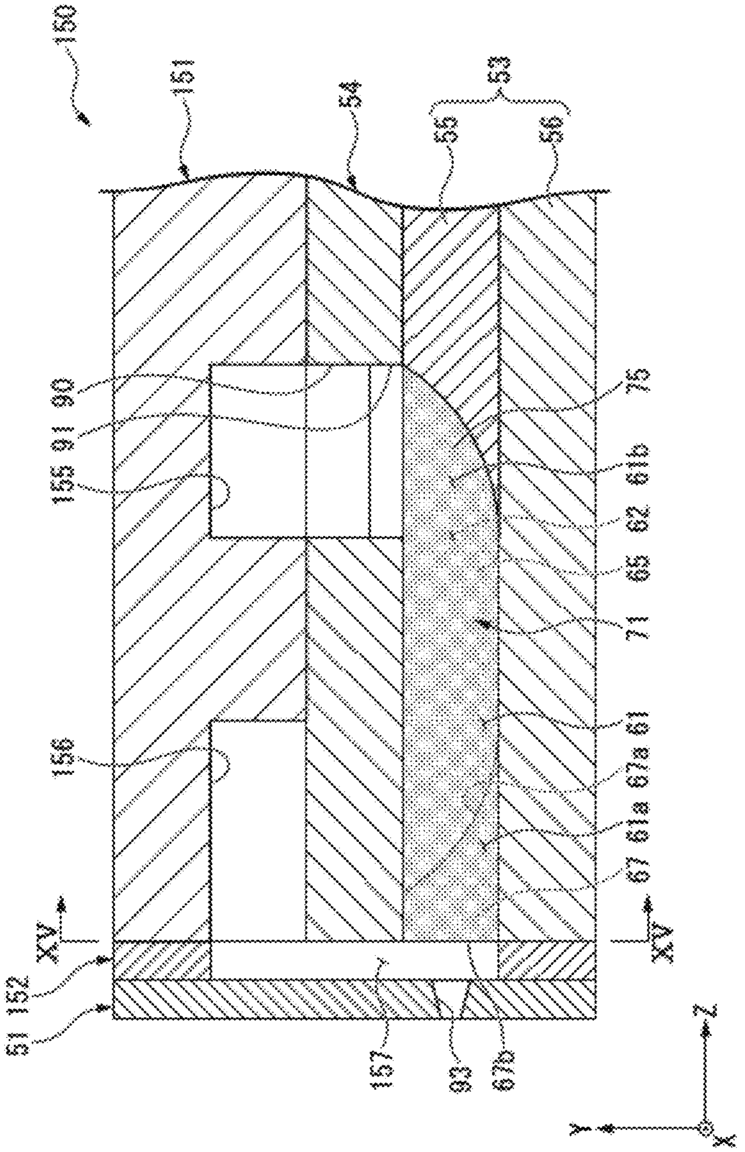
FIG. 14 is a cross-sectional view showing a cross-sectional surface along an ejection channel in a head chip according to a second embodiment.

The present embodiment is different from the embodiment described above in the point that a circulation type head chip 150 is adopted. FIG. 14 is a cross-sectional view showing a cross-sectional surface along the ejection channel 61 in the head chip 150 according to the second embodiment.

The head chip 150 shown in FIG. 14 is provided with a flow channel plate (a flow channel member) 151 and a feedback plate (an intermediate plate) 152 in addition to the nozzle plate 51, the actuator plate 53, and the cover plate (a flow channel member) 54.

The flow channel plate 151 is overlapped on an obverse surface of the cover plate 54. The flow channel plate 151 is provided with an entrance manifold (an entrance flow channel) 155 and an exit manifold (an exit flow channel) 156. The entrance manifold 155 is formed in a portion overlapping the entrance common ink chamber 90 viewed from the Y direction out of the flow channel plate 151. Specifically, the entrance manifold 155 opens on the reverse surface of the flow channel plate 151, and at the same time, extends in the X direction. The entrance manifold 155 is communicated with the entrance common ink chamber 90 through a reverse surface-side opening part. In contrast, the entrance manifold 155 is coupled to the ink tank 15 through, for example, an entrance port (not shown) disposed in one end portion in the X direction in the flow channel plate 151.

The exit manifold 156 opens on the lower end surface of the flow channel plate 151, and at the same time, extends in the X direction. The exit manifold 156 is coupled to the ink tank 15 through, for example, an exit port (not shown) disposed in the other end portion in the X direction in the flow channel plate 151.

Figure 15:
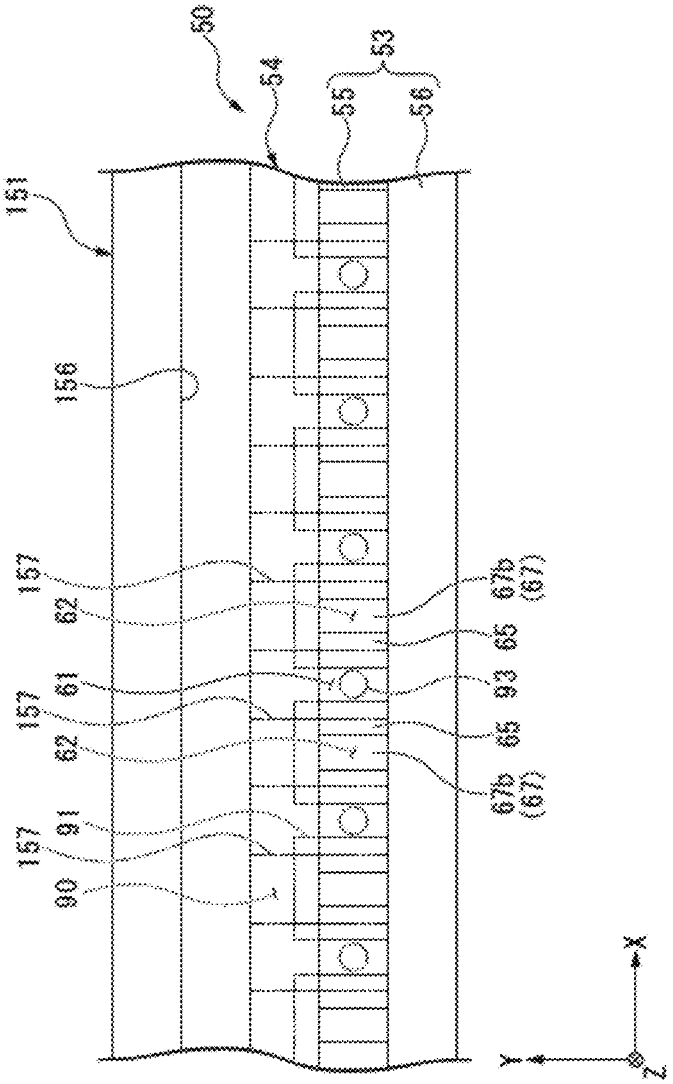
FIG. 15 is a cross-sectional view which is viewed in a state of seeing through a feedback plate, and corresponds to the line XV-XV shown in FIG. 14 in the head chip according to the second embodiment.

FIG. 15 is a cross-sectional view which is viewed in a state of seeing through a feedback plate, and corresponds to the line XV-XV shown in FIG. 14.

As shown in FIG. 14 and FIG. 15, the feedback plate 152 is disposed between the actuator plate 53 and the nozzle plate 51. Specifically, an upper end surface of the feedback plate 152 is bonded to the lower end surfaces of the actuator plate 53, the cover plate 54, and the flow channel plate 151 in a lump. To the lower end surface of the feedback plate 152, there is bonded the nozzle plate 51.

In the feedback plate 152, at positions overlapping at least the ejection channels 61 viewed from the Z direction, there are respectively formed circulation channels (communication channels) 157. The circulation channels 157 each communicate the corresponding ejection channel 61 and the nozzle hole 93 with each other, and each communicate the ejection channel 61 and the exit manifold 156 with each other. The circulation channels 157 penetrate the feedback plate 152 in the Z direction, and at the same time, extends in the Y direction. The circulation channels 157 are respectively communicated with the corresponding ejection channels 61 in the −Y side end portions. The circulation channels 157 are communicated with the exit manifold 156 in a lump in the +Y side end portions. It should be noted that the width in the X direction of the circulation channels 157 is preferably wider than the width in the X direction of the ejection channels 61.

In the head chip 150 in the present embodiment, the ink flowing through the entrance manifold 155 passes through the entrance common ink chamber 90, and then inflows into the ejection channels 61 via the respective entrance slits 91. The ink flowing through the ejection channels 61 inflows into the circulation channels 157. A part of the ink flowing through each of the circulation channels 157 is ejected from the nozzle hole 93 due to the increase in pressure in the ejection channel 61 in accordance with the thickness-shear deformation of the drive wall 65 described above. In contrast, the rest of the ink flowing through each of the circulation channels 157 inflows into the exit manifold 156. The ink having inflowed into the exit manifold 156 is returned to the ink tank 15 via an exit port. Subsequently, the ink having been returned to the ink tank 15 is supplied once again to the head chip 150.

In the head chip 150 in the present embodiment, there is adopted the configuration in which the feedback plate 152 having the circulation channels 157 is disposed between the actuator plate 53 and the nozzle plate 51.

According to this configuration, since the non-ejection channels 62 are not opened on the lower end surface of the actuator plate 53, it is possible to ensure the circulation channels 157 large in dimension in the X direction. Therefore, it is easy to allow the misalignment in the X direction between, for example, the nozzle holes 93 and the circulation channels 157, or the ejection channels 61 and the circulation channels 157. Therefore, it is possible to ensure the flow channel cross-sectional area in the communication areas between the nozzle holes 93 and the circulation channels 157, and between the ejection channels 61 and the circulation channels 157.

In the head chip 150 in the present embodiment, since it is possible to ensure the circulation channels 157 large in dimension in the X direction, it is easy to ensure the flow channel cross-sectional area of the circulation channels 157. In this case, since it is possible to increase the flow rate of the ink flowing through the circulation channels 157, it is possible to achieve suppression of clogging with a bubble in the nozzle holes 93 and an increase in ejection amount of the ink through the nozzle holes 93. Further, the pressure fluctuation generated in one of the ejection channels 61 when, for example, ejecting the ink is easily dissipated in the circulation channel 157. Therefore, even when the plurality of ejection channels 61 are communicated with each other through the exit manifold 156, it is possible to suppress a so-called cross talk in which the pressure fluctuation generated in one of the ejection channels 61 propagates to other ejection channels 61 through the exit manifold 156 and the circulation channels 157.

On the other hand, since it is possible to ensure the circulation channels 157 large in dimension in the X direction, it is possible to suppress the thickness (the dimension in the Z direction) of the feedback plate 152 while ensuring the flow channel cross-sectional area of the circulation channels 157. Therefore, it is possible to efficiently propagate the pressure fluctuation generated inside the ejection channel 61 when ejecting the ink to the nozzle hole 93.

As a result, it is possible to improve the ejection performance.

It should be noted that the circulation channels 157 can extend in, for example, a direction crossing the Y direction providing there is adopted a configuration in which the circulation channels 157 each individually communicate one of the ejection channels 61 and the exit manifold 156 with each other. Further, in the embodiment described above, there is described the configuration in which the entrance manifold 155 and the exit manifold 156 are provided to the single flow channel plate 151, but this configuration is not a limitation. For example, it is possible to dispose the flow channel plate 151 having the entrance manifold 155 at an obverse surface side of the cover plate 54, and dispose a flow channel plate having the exit manifold 156 at a reverse surface side of the back plate 56.

Third Embodiment

Figure 16:
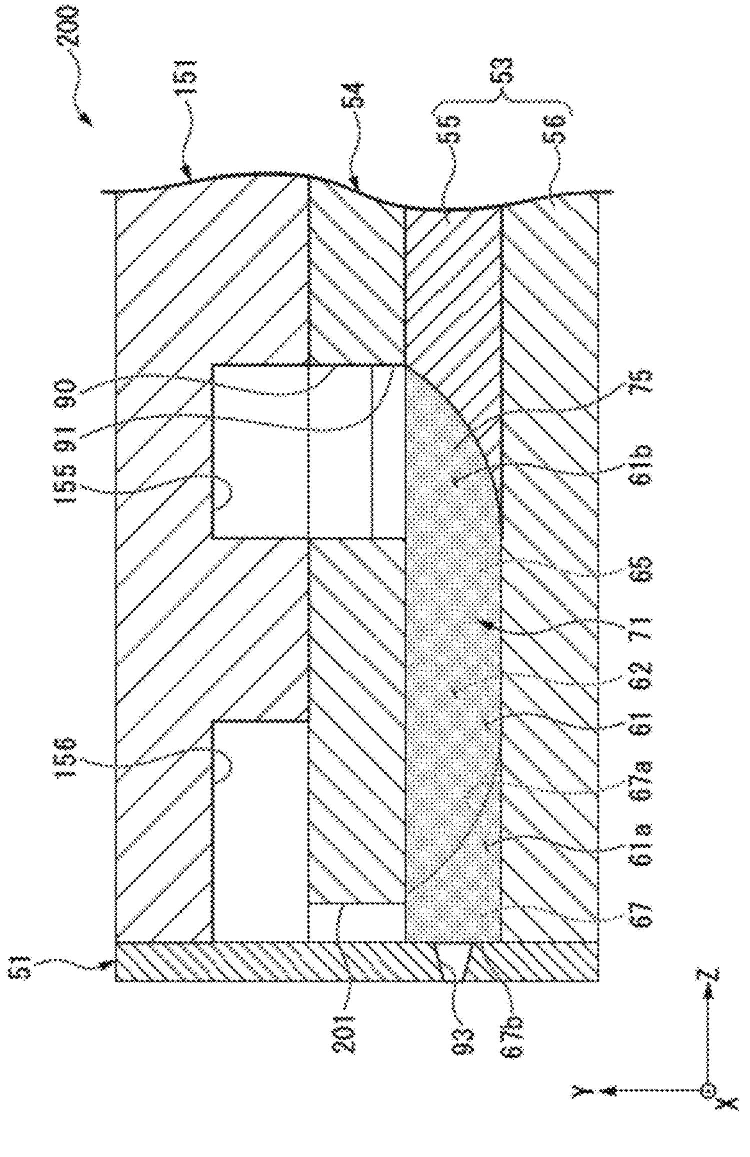
FIG. 16 is a front view corresponding to FIG. 5 in the head chip according to the second embodiment.
Figure 17:
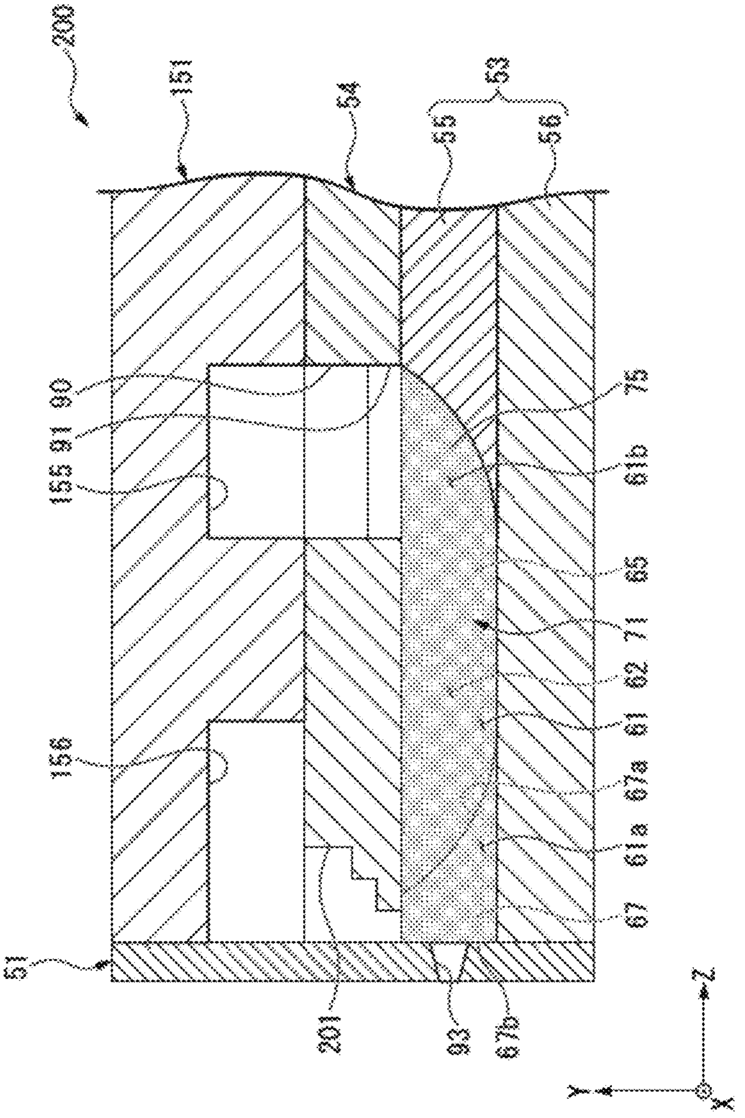
FIG. 17 is a cross-sectional view showing a cross-sectional surface along an ejection channel in a head chip according to a third embodiment.
Figure 18:
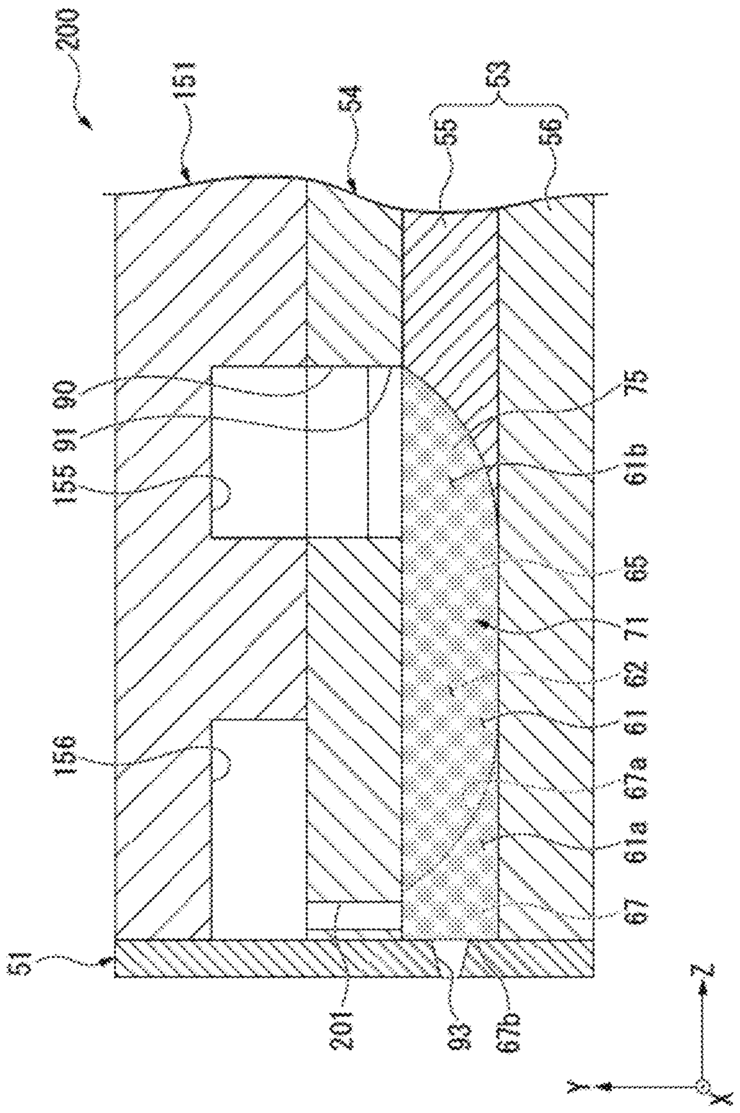
FIG. 18 is a cross-sectional view showing a cross-sectional surface along an ejection channel in a head chip according to the modified example.

A head chip 200 according to the present embodiment is different from that in the embodiment described above in the point that the cover plate 54 is provided with circulation channels 201. FIG. 16 is a cross-sectional view showing a cross-sectional surface along the ejection channel 61 in the head chip 200 according to the third embodiment.

In the head chip 200 shown in FIG. 16, in the lower end portion of the cover plate 54, there are formed the circulation channels 201. The plurality of circulation channels 201 are disposed at intervals in the X direction so as to correspond respectively to the ejection channels 61. The circulation channels 201 penetrate the cover plate 54 in the Y direction, and at the same time, open on the lower end surface of the cover plate 54. In the illustrated example, the circulation channels 201 are formed to have the flow channel cross-sectional area (the area perpendicular to the Y direction) uniform over the entire length, and at the same time, extend linearly in the Y direction.

The −Y side end portions of the circulation channels 201 are respectively communicated with the ejection channels 61. In contrast, the +Y side end portions of the circulation channels 201 are communicated with the exit manifold 156 in a lump. It should be noted that the circulation channels 201 can extend in, for example, a direction crossing the Y direction providing there is adopted a configuration in which the circulation channels 157 each individually communicate one of the ejection channels 61 and the exit manifold 156 with each other.

According to this configuration, similarly to the second embodiment described above, since the non-ejection channels 62 are not opened on the lower end surface of the actuator plate 53, it is easy to ensure the flow channel cross-sectional area of the circulation channels 201. Therefore, it is possible to achieve the suppression of the clogging with a bubble in the nozzle holes 93, and the increase in ejection amount of the ink through the nozzle holes 93.

Further, the pressure fluctuation generated in one of the ejection channels 61 when, for example, ejecting the ink is easily dissipated in the circulation channel 201, and therefore, it is possible to prevent the cross talk.

Modified Example

In the embodiment described above, there is described the configuration in which the circulation channels 201 are formed to have the flow channel cross-sectional area uniform over the entire length, but this configuration is not a limitation. For example, it is possible to adopt a configuration in which the flow channel cross-sectional area of the circulation channel 201 gradually increases along a direction toward the exit manifold 156.

According to this configuration, since it is possible to gradually increase the flow channel cross-sectional area of the circulation channels 201, it is possible to achieve the suppression of the clogging with a bubble in the nozzle holes 93 and the increase in ejection amount of the ink through the nozzle holes 93.

Further, the pressure fluctuation generated in one of the ejection channels 61 when, for example, ejecting the ink is easily dissipated in the circulation channel 201, and therefore, it is possible to prevent the cross talk.

In the embodiment described above, there is described the configuration in which the circulation channels 201 are opened on the lower end surface of the cover plate 54, but this configuration is not a limitation. For example, it is possible for the circulation flow channels 201 to penetrate a portion located above the lower end surface of the cover plate 54 in the Y direction. In this case, since the circulation channels 201 are not opened on the lower end surface of the cover plate 54, the whole of the lower end surface of the cover plate 54 forms a flat continuous surface. Therefore, it becomes easy to ensure the bonding area between the lower end surface of the cover plate 54 and the nozzle plate 51, and thus, it is possible to ensure the bonding strength. As a result, it is easy to ensure the durability of the head chip 200.

Figure 12:
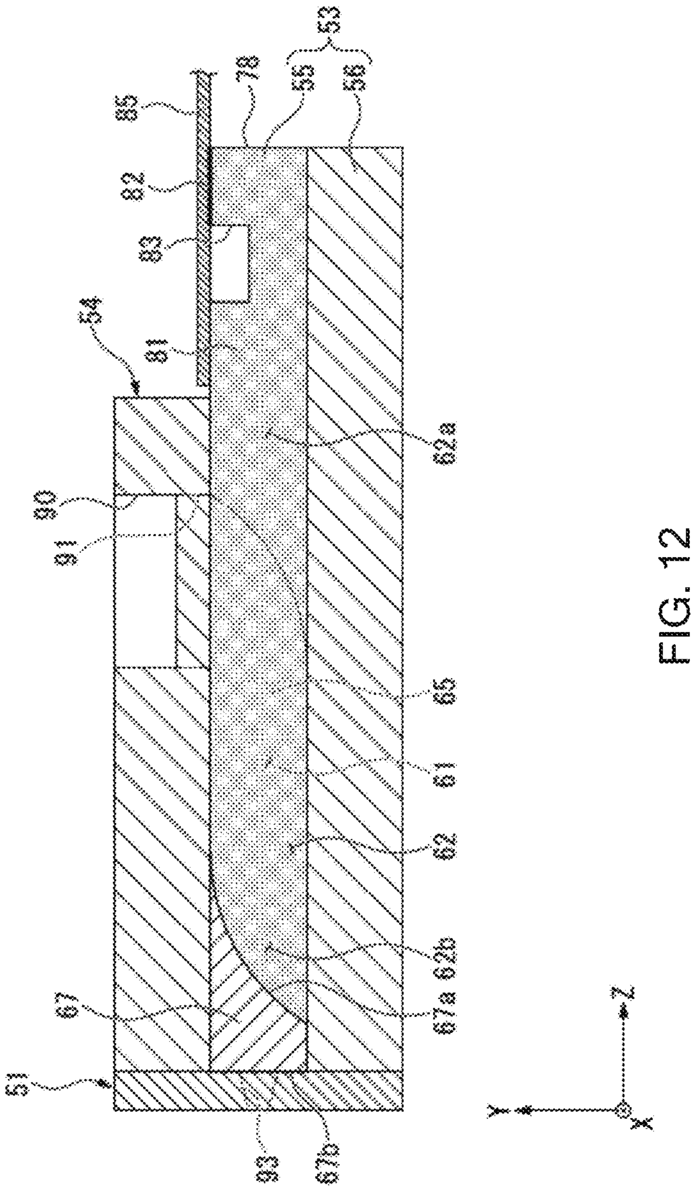
FIG. 12 is a cross-sectional view showing a cross-sectional surface along a non-ejection channel in a head chip according to a modified example.
Figure 19:
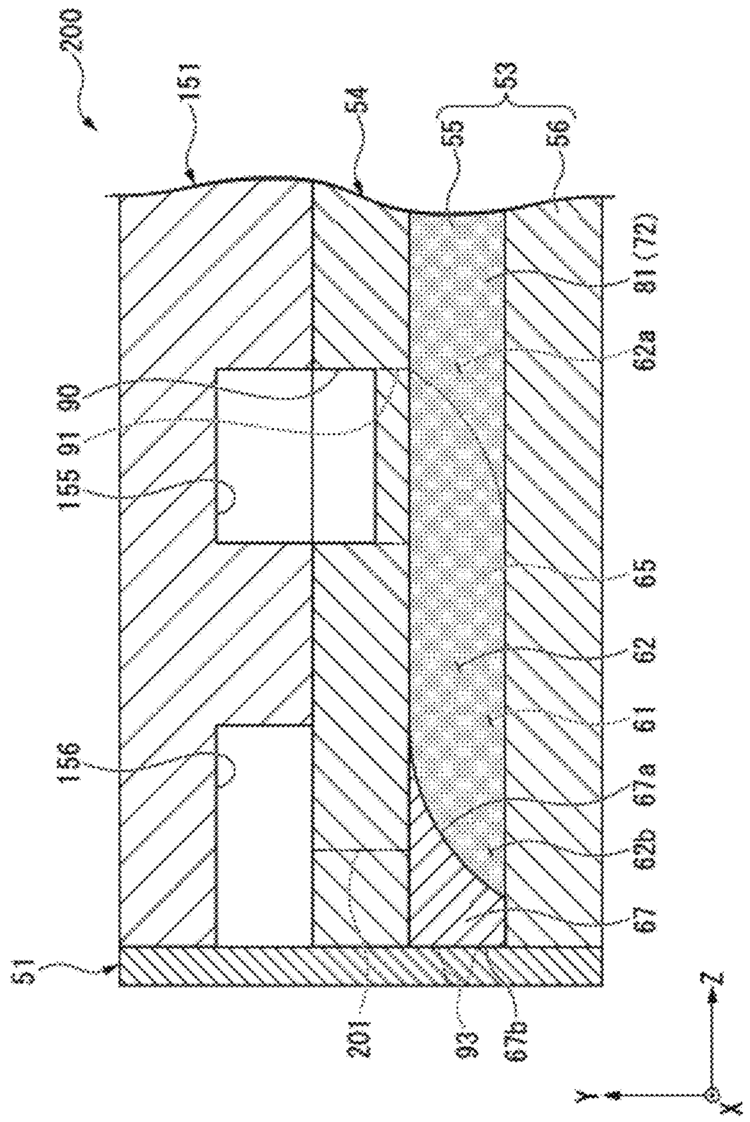
FIG. 19 is a cross-sectional view showing a cross-sectional surface along the non-ejection channel in a head chip according to the modified example.

The head chip 200 shown in FIG. 19 has a configuration in which the dimension in the Z direction of the blocking part 67 gradually increases along a direction from the reverse surface side toward the obverse surface side of the drive plate 55 similarly to the configuration shown in FIG. 12.

According to this configuration, it is easy to ensure the area of a portion located between the blocking inner-surface part 67*a* and the lower end surface of the actuator plate 53 on the obverse surface of the actuator plate 53. Therefore, it is possible to ensure the circulation channels 201 large in flow channel cross-sectional area. Thus, since it is possible to increase the circulation flow rate of the ink in the head chip 200, it is possible to achieve the suppression of the clogging with a bubble in the nozzle holes 93 and the increase in ejection amount of the ink through the nozzle holes 93.

Further, the pressure fluctuation generated in one of the ejection channels 61 when, for example, ejecting the ink is easily dissipated in the circulation channel 201, and therefore, it is possible to prevent the cross talk.

It should be noted that in the embodiment described above, there is described the configuration in which the entrance manifold 155 and the exit manifold 156 are provided to the single flow channel plate 151, but this configuration is not a limitation. For example, it is possible to dispose the flow channel plate 151 having the entrance manifold 155 at an obverse surface side of the cover plate 54, and dispose a flow channel plate having the exit manifold 156 at a reverse surface side of the back plate 56. In this case, the circulation channels 201 are provided to the back plate 56 as a result.

Fourth Embodiment

Figure 20:
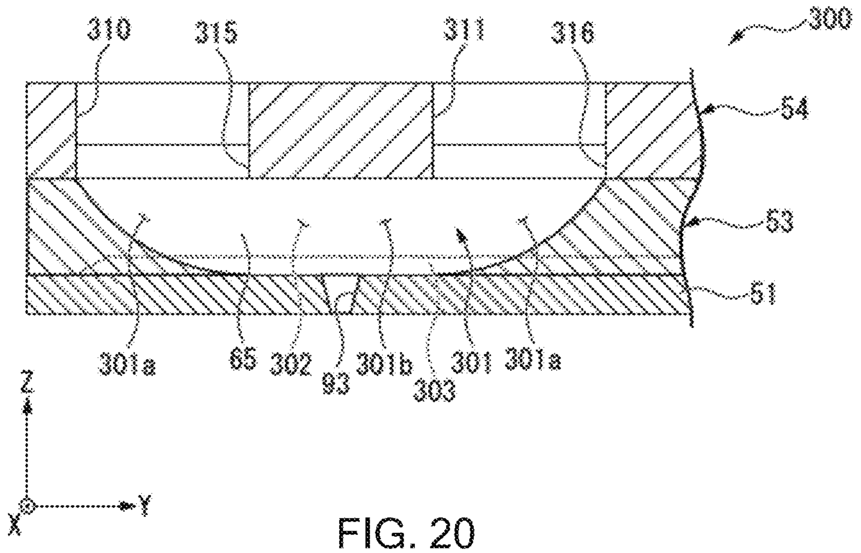
FIG. 20 is a cross-sectional view showing a cross-sectional surface along an ejection channel in a head chip according to a fourth embodiment.

The present embodiment is different from the first embodiment in the point that the configuration according to the present disclosure is adopted in a head chip 300 of a so-called side-shoot type. FIG. 20 is a cross-sectional view showing a cross-sectional surface along an ejection channel 301 in the head chip 300 according to the fourth embodiment.

As shown in FIG. 20, in the head chip 300, the ejection channel 301 is formed to have a curved shape convex downward (toward the −Z side) viewed from the X direction. The ejection channels 301 are formed by, for example, making a dicer having a disk-like shape enter the actuator plate 53 from below (the +Z side). Specifically, the ejection channel 301 has uprise parts 301*a* located at both end portions in the Y direction, and a penetration part 301*b* located between the uprise parts 301*a*.

The uprise parts 301*a* each have a circular arc shape which extends along, for example, the curvature radius of the dicer when viewed from the X direction. The uprise parts 301*a* each extend while curving toward the reverse surface side as getting away from the penetration part 301*b* in the Y direction.

The penetration part 301*b* penetrates the actuator plate 53 in the Z direction.

Figure 21:
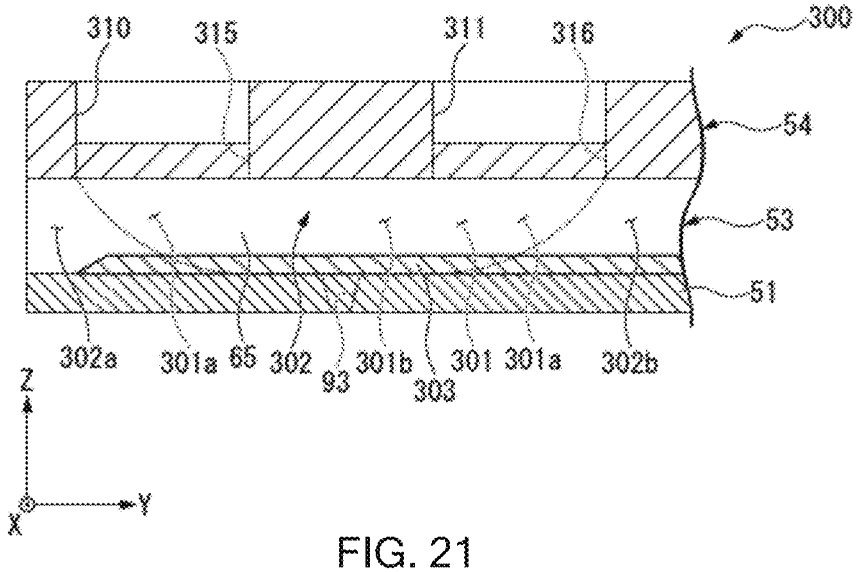
FIG. 21 is a cross-sectional view showing a cross-sectional surface along a non-ejection channel in the head chip according to the fourth embodiment.

FIG. 21 is a cross-sectional view showing a cross-sectional surface along a non-ejection channel 302 in the head chip 300 according to the fourth embodiment.

As shown in FIG. 21, the non-ejection channel 302 is adjacent to the ejection channel 301 across the drive wall 65 in the X direction. The non-ejection channel 302 extends linearly in the Y direction in the actuator plate 53. The non-ejection channel 302 is provided with a deep groove portion 302*a* and a shallow groove portion 302*b*.

The deep groove portion 302*a* is formed in the −Y side end portion (a portion located at the −Y side of the ejection channel 301) in the actuator plate 53. The deep groove portion 302*a* penetrates the actuator plate 53 in the Z direction.

The shallow groove portion 302*b* connects from the deep groove portion 302*a* toward the +Y side. The shallow groove portion 302*b* is opened on the upper surface of the actuator plate 53, and at the same time, terminated at a position separated upward from the lower surface of the actuator plate 53. In other words, the shallow groove portion 302*b* is not opened on the lower surface of the actuator plate 53. In the actuator plate 53, a portion located between the bottom surface of the shallow groove portion 302*b* and the lower surface of the actuator plate 53 constitutes a blocking part 303. The blocking part 303 blocks inside and outside of the non-ejection channel 302 from each other in the Z direction.

In the present embodiment, the blocking part 303 overlaps the ejection channels 301 when viewed from the X direction. It should be noted that it is sufficient for the blocking part 303 to be formed in at least an area overlapping the penetration part 301*b*.

The cover plate 54 is provided with an entrance common ink chamber 310 and an exit common ink chamber 311.

The entrance common ink chamber 310 is formed at a position overlapping, for example, the −Y side end portion of the ejection channel 301 in the plan view. The entrance common ink chamber 310 extends in the X direction with a length sufficient for straddling, for example, the channels 301, 302, and at the same time, opens on the upper surface of the cover plate 54.

The exit common ink chamber 311 is formed at a position overlapping, for example, the +Y side end portion of the ejection channel 301 in the plan view. The exit common ink chamber 311 extends in the X direction with a length sufficient for straddling the channels 301, 302, and at the same time, opens on the upper surface of the cover plate 54.

In the entrance common ink chamber 310, at the positions overlapping the respective ejection channels 301 in the plan view, there are formed entrance slits 315. The entrance slits 315 each communicate the −Y side end portion of corresponding one of the ejection channels 301 and the entrance common ink chamber 310 with each other.

In the exit common ink chamber 311, at the positions corresponding to the ejection channels 301, there are formed exit slits 316, respectively. The exit slits 316 each communicate the +Y side end portion of corresponding one of the ejection channels 301 and the exit common ink chamber 311 with each other. Therefore, the entrance slits 315 and the exit slits 316 are communicated with the respective ejection channels 301 on the one hand, but are not communicated with the non-ejection channels 302 on the other hand.

According to the present embodiment, since the non-ejection channels 302 are not opened on the lower surface of the actuator plate 53, it is possible to prevent the ink located inside the ejection channel 301 from entering the non-ejection channel 302 through the microscopic gap or the like unintentionally formed between the actuator plate 53 and the nozzle plate 51.

Therefore, it is possible to prevent the electrodes formed on the inner surfaces of the non-ejection channels 302 from eroding or shorting, and thus, it is possible to provide the head chip 300 which is excellent in electrical reliability, and in which an improvement in durability is achieved.

Figure 22:
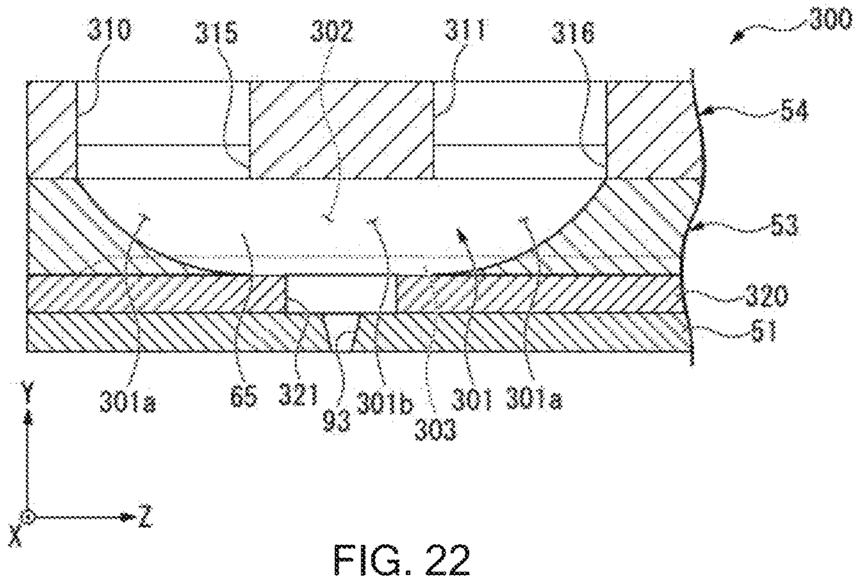
FIG. 22 is a cross-sectional view showing a cross-sectional surface along the ejection channel in a head chip according to the modified example.

It should be noted that in the embodiment described above, there is described the configuration in which the nozzle plate 51 is directly bonded to the lower surface of the actuator plate 53, but this configuration is not a limitation. An intermediate plate 320 can be disposed between the actuator plate 53 and the nozzle plate 51 as shown in FIG. 22. The intermediate plate 320 is fixed to the lower surface of the actuator plate 53 with an adhesive or the like. The intermediate plate 320 is formed of a piezoelectric material such as PZT similarly to the actuator plate 53. It should be noted that the intermediate plate 320 can be formed of a material (e.g., a nonconductive material such as polyimide or alumina) other than the piezoelectric material.

In the intermediate plate 320, a portion which overlaps the penetration part 301*b* of each of the ejection channels 301 in the plan view is provided with a communication hole 321. The communication holes 321 are communicated with the penetration parts 301*b* of the corresponding ejection channels 301, respectively, at the lower surface side of the actuator plate 53. The communication hole 321 is shorter in dimension in the Y direction than the penetration part 301*b*. In contrast, a dimension in the X direction of the communication hole 321 is wider than that of the penetration part 301*b*, and is made equivalent to the maximum inside diameter of the nozzle holes 93.

According to the present embodiment, since the non-ejection channels 302 are not opened on the lower surface of the actuator plate 53, it is possible to ensure the communication holes 321 large in dimension in the X direction. Therefore, it is easy to allow the misalignment in the X direction between, for example, the nozzle holes 93 and the communication holes 321, or the ejection channels 301 and the communication holes 321. Therefore, it is possible to ensure the flow channel cross-sectional area in the communication areas between the nozzle holes 93 and the communication holes 321, and between the ejection channels 301 and the communication holes 321.

Other Modified Examples

It should be noted that the technical scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiment described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction along the horizontal direction.

In the embodiments described above, there is described the configuration in which the first direction coincides with the Z direction, and the second direction coincides with the X direction, but this configuration is not a limitation. The first direction and the second direction can be defined differently from the X direction and the Z direction.

Besides the above, it is arbitrarily possible to replace the constituents in the embodiments described above with known constituents within the scope or the spirit of the present disclosure, and it is also possible to arbitrarily combine the modified examples described above.

What is claimed is:

1. A head chip comprising:

an actuator plate in which a jet channel extending in a first direction and a non-jet channel extending in the first direction are arranged alternately in a second direction crossing the first direction;

a jet orifice plate which has a jet orifice communicated with the jet channel, and faces the actuator plate, wherein:

the actuator plate comprises a blocking part disposed between the non-jet channel and the jet orifice plate, the blocking part and the actuator plate being formed as one piece, the non-jet channel is terminated at a position separated from an opposed surface to the jet orifice plate in the actuator plate, and the jet channel opens on the opposed surface; and a flow channel member overlapped in a thickness direction crossing the second direction viewed from the first direction in the actuator plate, wherein:

the opposed surface is a surface of the actuator plate which faces to the first direction, and the flow channel member includes a circulation channel which is provided to a portion located between the non-jet channel and the opposed surface in the first direction, and is individually communicated with the jet channel, an entrance flow channel which is provided to a portion located at an opposite side to the opposed surface in the first direction with respect to the circulation channel, and is communicated with the jet channel, and an exit flow channel communicated with a plurality of circulation channels.

2. The head chip according to claim 1, further comprising an intermediate plate which is disposed between the actuator plate and the jet orifice plate, and is provided with a communication channel configured to individually communicate the jet channel and the jet orifice with each other.

3. The head chip according to claim 1, wherein a flow channel cross-sectional area of the circulation channel increases as getting away from the jet channel.

4. The head chip according to claim 1, wherein an end surface of the non-jet channel at the opposed surface side is formed as an inclined surface which extends in a direction of getting away from the flow channel member in the thickness direction as getting closer to the opposed surface in the first direction.

5. The head chip according to claim 1, wherein the circulation channel is disposed at a position separated from the opposed surface in a portion located between the non-jet channel and the opposed surface in the first direction, in the flow channel member.

6. A head chip comprising:

an actuator plate in which a jet channel extending in a first direction and a non-jet channel extending in the first direction are arranged alternately in a second direction crossing the first direction;

a jet orifice plate which has a jet orifice communicated with the jet channel, and faces the actuator plate, wherein:

the non-jet channel is terminated at a position separated from an opposed surface to the jet orifice plate in the actuator plate, and the jet channel opens on the opposed surface; and wherein an end surface of the non-jet channel at the opposed surface side includes:

a first inclined surface extending in a direction of getting away from the opposed surface in the first direction as getting away from a first surface facing to a thickness direction crossing the second direction viewed from the first direction, in the actuator plate, and a second inclined surface which gets away from the opposed surface in the first direction as getting away from a second surface located oppositely to the first surface in the thickness direction, in the actuator plate, and connects to the first inclined surface.

7. A liquid jet head comprising the head chip according to claim 1.

8. A liquid jet recording device comprising the liquid jet head according to claim 7.

* * * * *